US009862362B2

(12) United States Patent
Kaneko et al.

(10) Patent No.: US 9,862,362 B2
(45) Date of Patent: Jan. 9, 2018

(54) VEHICLE DISC BRAKE

(71) Applicant: NISSIN KOGYO CO., LTD., Ueda, Nagano (JP)

(72) Inventors: Shinobu Kaneko, Nagano (JP); Shinichi Kihara, Nagano (JP); Masakazu Hirabayashi, Nagano (JP); Michio Takahashi, Nagano (JP)

(73) Assignee: NISSIN KOGYO CO., LTD., Nagano (JP)

( * ) Notice: Subject to any disclaimer, the term of this patent is extended or adjusted under 35 U.S.C. 154(b) by 0 days.

(21) Appl. No.: 14/977,745

(22) Filed: Dec. 22, 2015

(65) Prior Publication Data

US 2016/0185323 A1    Jun. 30, 2016

(30) Foreign Application Priority Data

Dec. 25, 2014 (JP) .................................. 2014-263438
Feb. 16, 2015 (JP) .................................. 2015-027138

(51) Int. Cl.
*F16D 65/097* (2006.01)
*B60T 1/06* (2006.01)
(Continued)

(52) U.S. Cl.
CPC ............ *B60T 1/065* (2013.01); *F16D 55/226* (2013.01); *F16D 65/0972* (2013.01); *F16D 2055/0029* (2013.01)

(58) Field of Classification Search
CPC .............. F16D 65/097; F16D 65/0997; F16D 65/0979; F16D 65/0978
(Continued)

(56) References Cited

U.S. PATENT DOCUMENTS 6,223,867 B1 *   5/2001   Doi .................... F16D 55/226
                                                   188/72.4
7,455,153 B2 *  11/2008   Ooshima ............ F16D 65/0972
                                                   188/18 A
(Continued)

FOREIGN PATENT DOCUMENTS

JP          2000220670          8/2000
JP          2002327780         11/2002
(Continued)

OTHER PUBLICATIONS

Japanese Office Action in related Japanese Application No. 2014-263438 dated May 9, 2017, 6 pages.
(Continued)

*Primary Examiner* — Thomas Irvin
(74) *Attorney, Agent, or Firm* — Andrew M. Calderon; Roberts Mlotkowski Safran Cole & Calderon, P.C.

(57) ABSTRACT

One embodiment provides a vehicle disc brake including: a caliper body; a caliper bracket having a pair of caliper support arms; a pair of friction pads; and a pad return spring. Each caliper support arm has a pair of pad guide grooves, and a pair of lug pieces extending from the friction pad are supported movably therein. An outer surface of each lug piece is stepped such that a projecting length on a radially outer side is shorter than a projecting length on a radially inner side, thereby defining a space portion between the lug piece and the pad guide groove. A first imaginary line, which is defined to pass a gravity center of the friction pad and to intersect perpendicularly a center line connecting a center of a disc rotor and a center of a piston, passes the space.

19 Claims, 21 Drawing Sheets

(51) Int. Cl.
*F16D 55/226* (2006.01)
*F16D 55/00* (2006.01)

(58) Field of Classification Search
USPC .............................................. 188/72.3, 73.38
See application file for complete search history.

(56) References Cited

U.S. PATENT DOCUMENTS

| | | | | |
|---|---|---|---|---|
| 8,540,060 | B2* | 9/2013 | Hayashi | F16D 65/097 188/1.11 W |
| 8,684,148 | B2* | 4/2014 | Wakabayashi | F16D 65/0972 188/73.36 |
| 8,967,338 | B2* | 3/2015 | Wakabayashi | F16D 65/0971 188/250 B |
| 9,377,070 | B2* | 6/2016 | Miyake | F16D 65/0978 |
| 9,388,869 | B2* | 7/2016 | Zhang | F16D 65/0972 |
| 2009/0166135 | A1* | 7/2009 | Sano | F16D 65/097 188/71.8 |
| 2014/0367208 | A1* | 12/2014 | Miyake | F16D 55/227 188/72.3 |
| 2015/0001011 | A1* | 1/2015 | Zhang | F16D 65/0972 188/72.3 |
| 2015/0247542 | A1* | 9/2015 | Yukumi | F16D 65/0977 188/72.3 |

FOREIGN PATENT DOCUMENTS

| | | |
|---|---|---|
| JP | 2007315577 | 12/2007 |
| JP | 20100156417 | 7/2010 |
| JP | 2010236616 | 10/2010 |
| JP | 2010236619 | 10/2010 |
| JP | 5242481 | 7/2013 |

OTHER PUBLICATIONS

Japanese Office Action in related Japanese Application No. 2015-027138 dated May 9, 2017, 6 pages.

* cited by examiner

VEHICLE DISC BRAKE

CROSS-REFERENCE TO RELATED APPLICATION(S)

This application claims priorities from Japanese Patent Applications No. 2014-263438 filed on Dec. 25, 2014, and No. 2015-027138 filed on Feb. 16, 2015, the entire contents of which are incorporated herein by reference.

FIELD

The present invention relates to a vehicle disc brake and more particularly to a vehicle disc brake in which a pair of lug pieces which are provided at side portions of a backing plate of a friction pad so as to project therefrom are movably supported in pad guide grooves which are formed individually in caliper support arms of a caliper bracket so that the friction pad can be supported movably in an axial direction of a disc rotor.

Meanwhile, the present invention also relates to a vehicle disc brake and more particularly to a vehicle disc brake which includes a pad return spring which makes friction pads move away from a disc rotor forcibly when the brake is released.

BACKGROUND

For example, in some of disc brakes in which a pair of lug pieces which are provided at side portions of a backing plate of a friction pad so as to project are guided movably in pad guide grooves which are formed individually in caliper support arms of a caliper bracket, a pad return spring may be disposed between the lug pieces and the caliper support arms so that the friction pad is biased towards an opposite side to a disc rotor when the brake is released.

Such pad return spring may include a retainer portion which is disposed on a torque bearing surface of the pad guide groove to guide the moving friction pad and a pad return portion which biases the friction pad towards the opposite side to the disc rotor when the brake is released by bringing an extending piece which extends from the retainer portion into abutment with the lug piece via a curved portion. The pad return portion may be formed by forming an elastic portion by bending back an elongated piece in the direction of the disc rotor from a side of the retainer portion which is opposite to the disc rotor, causing a distal end side of the elongated piece to extend further towards the disc rotor and inclining a distal end portion of the elongated piece while bending it back along the extending direction into a curved shape. A space portion may be defined between the lug piece of the friction pad and the pad guide groove to permit the operation of the pad return portion (for example, refer to JP-5242481-B).

With such exemplary vehicle disc brake, however, the configuration of the pad return spring becomes complex, leading to fears that the production costs are increased. Further, in the friction pad, when the brake is applied, due to braking torque generated by the friction contact of the friction pad with the disc rotor, a force attempting to depress the friction pad radially inwards of the disc rotor acts at a disc-rotor-exit side and a force attempting to lift the friction pad radially outwards of the disc rotor acts at a disc-rotor-entrance side, whereby the lug piece at the disc-rotor-exit side is pressed against a surface of the pad guide groove which faces a radially inner side of the disc rotor, and the lug piece at the disc-rotor-entrance side is pressed against a surface of the pad guide groove which faces a radially outer side of the disc rotor. This causes the lug pieces to be fixed in the pad guide grooves. However, there are fears that the lug pieces are prevented from being fixed in the pad guide grooves by means of the spring force of the pad return portion, resulting in fears that brake noise or squeal is generated.

Meanwhile, there may also be provided a vehicle disc brake in which caliper support arms are provided on a caliper bracket which is fixed to a vehicle body so as to extend therefrom and a pad return spring is disposed between the caliper support arms and side portions of backing plates of a pair of friction pads which are disposed so as to hold a disc rotor therebetween to bias the friction pads so as to move away from the disc rotor. This pad return spring may include a backing plate attaching portion which is attached to the side portion of the backing plate and a pad return portion which extends from the backing plate attaching portion and which is brought into abutment with the caliper support art at a distal end thereof to thereby bias the friction pad so as to move away from the disc rotor (for example, refer to JP-2000-220670-A).

In such exemplary vehicle disc brake, however, the biasing force of the pad return spring increases according to the displacement amount, and therefore, for example, in such a state that the wear of the friction pad develops to a state resulting just before the friction pad is fully worn up, the biasing force with which the friction pad is caused to move away from the disc rotor increases so greatly that the friction pad is caused to retreat greatly. This increases the distance between the friction pad and the disc rotor, resulting in fears that the braking or brake pedal operation feeling is affected badly.

SUMMARY

One object of the invention is to provide a vehicle disc brake which can restrict the generation of brake noise or squeal and which can make a friction pad move well away from a disc rotor when the brake is released with a simple configuration.

A first aspect of the present invention provides a vehicle disc brake including:

a caliper body;

a caliper bracket which is fixed to a vehicle body, and which has a pair of caliper support arms extending to straddle an outer edge of a disc rotor in an axial direction thereof, each caliper support arm having a pair of pad guide grooves;

a pair of friction pads which is disposed at each side of the disc rotor, each friction pad having a backing plate, the backing plate having a pair of lug pieces extending from side portions thereof, the lug pieces being supported movably in the pad guide grooves; and a pad return spring which is disposed between the lug pieces and the caliper support arms to bias the friction pad so as to move away from the disc rotor when the brake is released, wherein an outer surface of each lug piece in a rotating direction of the disc rotor has a stepped shape in which a projecting length on a radially outer side is shorter than a projecting length on a radially inner side, and a space portion is defined between the radially outer side of the lug piece and the pad guide groove, and wherein the space portion is disposed in a position where a first imaginary line passes, the first imaginary line being defined to pass a gravity center of the friction pad and to intersect perpendicularly a center line connecting a center of the disc rotor and a center of a piston.

A second aspect of the present invention provides, based on the above configuration, the vehicle disc brake, wherein the space portion is disposed in the position where a second imaginary line also passes, the second imaginary line being defined to pass the center of the piston and to intersect perpendicularly the center line.

A third aspect of the present invention provides, based on the above configuration, wherein the pad return spring includes:

a locking portion which is locked on the lug piece;

a spring portion which is formed by bending back an extending piece which extends from the locking portion so as to move away from the disc rotor towards the disc rotor via a curved portion; and an abutment portion which is provided at a distal end of the spring portion and which is brought into abutment with a side surface of the caliper support arm which lies opposite to a side surface facing the disc rotor.

A fourth aspect of the present invention provides, based on the above configuration, wherein the locking portion is also disposed in the position where the first imaginary line passes.

According to the above-described vehicle disc brake, when the force attempting to depress the friction pad radially inwards of the disc rotor is exerted on the disc-rotor-exit side and the force attempting to lift the friction pad radially outwards of the disc rotor is exerted on the disc-rotor-entrance side by the braking torque generated as a result of the sliding contact of the friction pad with the disc rotor when the brake is applied, the force attempting to depress the disc-rotor-exit side of the friction pad is promoted whereby the radially inward side of the lug piece at the disc-rotor-exit side is pressed strongly against the surface of the pad guide groove facing the disc-rotor-exit side because the space portion is defined between the lug piece at the disc-rotor-exit side and the pad guide groove and the space portion is disposed in the position where the imaginary line passes which passes the gravity center of the friction pad and which intersects perpendicularly the center line which connects the center of the disc rotor with the center of the piston. In association with this, the radially outward side of the lug piece at the disc-rotor-entrance side is pressed strongly against the surface of the pad guide groove which faces the radially outer side of the disc rotor, whereby the lug piece is fixed within the pad guide groove, thereby restricting the generation of brake noise or squeal.

Further, the force attempting to depress the disc-rotor-exit side of the friction pad radially inwards of the disc rotor is promoted by the braking torque because the space portion is disposed in the position where the second imaginary line passes which passes the center of the piston and which intersects perpendicularly the center line.

In addition, the pad return spring includes the locking portion which is locked on the lug piece, the spring portion which is formed by bending back the extending piece which extends from the locking portion so as to move away from the disc rotor towards the disc rotor via the curved portion, and the abutment portion which is provided at the distal end of the spring portion and which is brought into abutment with the surface of the side of the caliper support arm which is opposite to the side facing the disc rotor. This obviates the necessity of disposing the spring portion of the pad return spring in the space portion, which is the case with the exemplary vehicle disc brake, and the pad return spring has only the spring force which biases the friction pad so as to move away from the disc rotor when the brake is released. Therefore, there are no fears that fixing the lug piece in place within the pad guide groove is interrupted when the brake is applied. Further, the locking portion of the pad return portion is disposed in the position where the first imaginary line passes, whereby when the brake is released, the friction pad is pulled back in a horizontal direction by means of the spring force of the pad return spring so that the friction pad can move away from the side surface of the disc rotor, thereby preventing the wear of a lining of the friction pad.

Meanwhile, another object of the invention is to provide a vehicle disc brake which can continue to make a friction pad move away from a disc rotor appropriately when the brake is released for a long period of time from when the friction pad is new to just before the friction pad is fully worn up.

A fifth aspect of the present invention provides, a vehicle disc brake including:

a caliper body;

a caliper bracket which is fixed to a vehicle body, and which has a pair of caliper support arms extending to straddle an outer edge of a disc rotor in an axial direction thereof, each caliper support arm having a pair of pad guide portions;

a pair of friction pads which is disposed at each side of the disc rotor, each friction pad having a backing plate, the backing plate having a pair of lug pieces extending from side portions thereof, the lug pieces being supported movably in the pad guide portions; and a pad return spring which is disposed between the lug pieces and the caliper support arms to bias the friction pad so as to move away from the disc rotor when the brake is released, wherein the pad return spring includes:

a locking portion which is locked on the lug piece;

a first extending piece which extends from the locking portion so as to move away from the disc rotor via a first curved portion;

a second extending piece which is formed by bending back a distal end portion of the first extending piece towards the disc rotor via a second curved portion; and an abutment portion which is provided at a distal end of the second extending piece and which is brought into abutment with a side surface of the caliper support arm which lies opposite to a side surface facing the disc rotor, wherein the first extending piece is provided so as to be inclined gradually outwards of the friction pad from the first curved portion to the second curved portion in a free state in which the locking portion is locked on the lug piece, and wherein, when the friction pad is assembled to the pad guide portions and the abutment portion is brought into abutment with the side surface of the caliper support arm which lies opposite to the side surface facing the disc rotor, the first extending piece comes near to a state in which the first extending piece is parallel to an axis of the disc rotor, and as the friction pad moves towards the disc rotor, the first extending piece comes nearer to the state in which the first extending piece is parallel to the axis of the disc rotor, thereby decreasing gradually a displacement amount thereof.

A sixth aspect of the present invention provides, based on the above configuration, the vehicle disc brake, wherein a sectional area of the second extending piece is smaller than a sectional area of the first extending piece.

A seventh aspect of the present invention provides, based on the above configuration, the vehicle disc brake, wherein a width of the second extending piece is narrower than a width of the first extending piece.

An eighth aspect of the present invention provides, based on the above configuration, the vehicle disc brake, wherein an elongated hole is formed in the second extending piece.

According to the above-described disc brake, in the pad return spring, a biasing force attempting to press the friction pad so as to move away from the disc rotor is generated by the displacement of both the first extending piece and the second extending piece in an initial state of braking. Then, as the friction pad moves towards the disc rotor, the first extending piece comes near to the state in which the first extending piece is parallel to the axis of the disc rotor, whereby the displacement amount thereof gradually decreases, and the increase in biasing force of the first extending piece becomes small. Thus, when the brake is released, the friction pad is caused to move away from the disc rotor mainly by means of the biasing force of the second extending piece.

In a state resulting just before the lining of the friction pad is fully worn up, although the backing plate of the friction pad comes near to the disc rotor when the brake is applied, due to the pad return spring being a non-linear characteristic spring in which the biasing force changes as the friction pad moves in the axial direction of the disc rotor, the biasing force of the pad return spring increases moderately as the backing plate comes near to the disc rotor, and hence, there is no such situation that the friction pad is caused to retreat greatly when the brake is released, which would be the case with the exemplary vehicle disc brake, thereby maintaining a good braking or brake pedal operation feeling.

The biasing force of the pad return spring is allowed to increase more moderately as the backing plate of the friction pad comes near to the disc rotor by making the sectional area of the second extending piece smaller than the sectional area of the first extending piece. The sectional area of the second extending piece can easily be made smaller than the sectional area of the first extending piece and the space for installation of the pad return spring can be saved by making the width of the second extending piece narrower than the width of the first extending piece. The sectional area of the second extending piece can easily be made smaller than the sectional area of the first extending piece by forming an elongated hole in the second extending piece, and the biasing force of the second extending piece can be controlled by changing the length and shape of the elongated hole. Even when an external force is exerted on the second extending in a twisting direction, the force so exerted is scattered to both side portions of the elongated hole, and therefore, the concentration of stress caused by the external force can be avoided.

DETAILED DESCRIPTION

Embodiment 1

Figure 1:
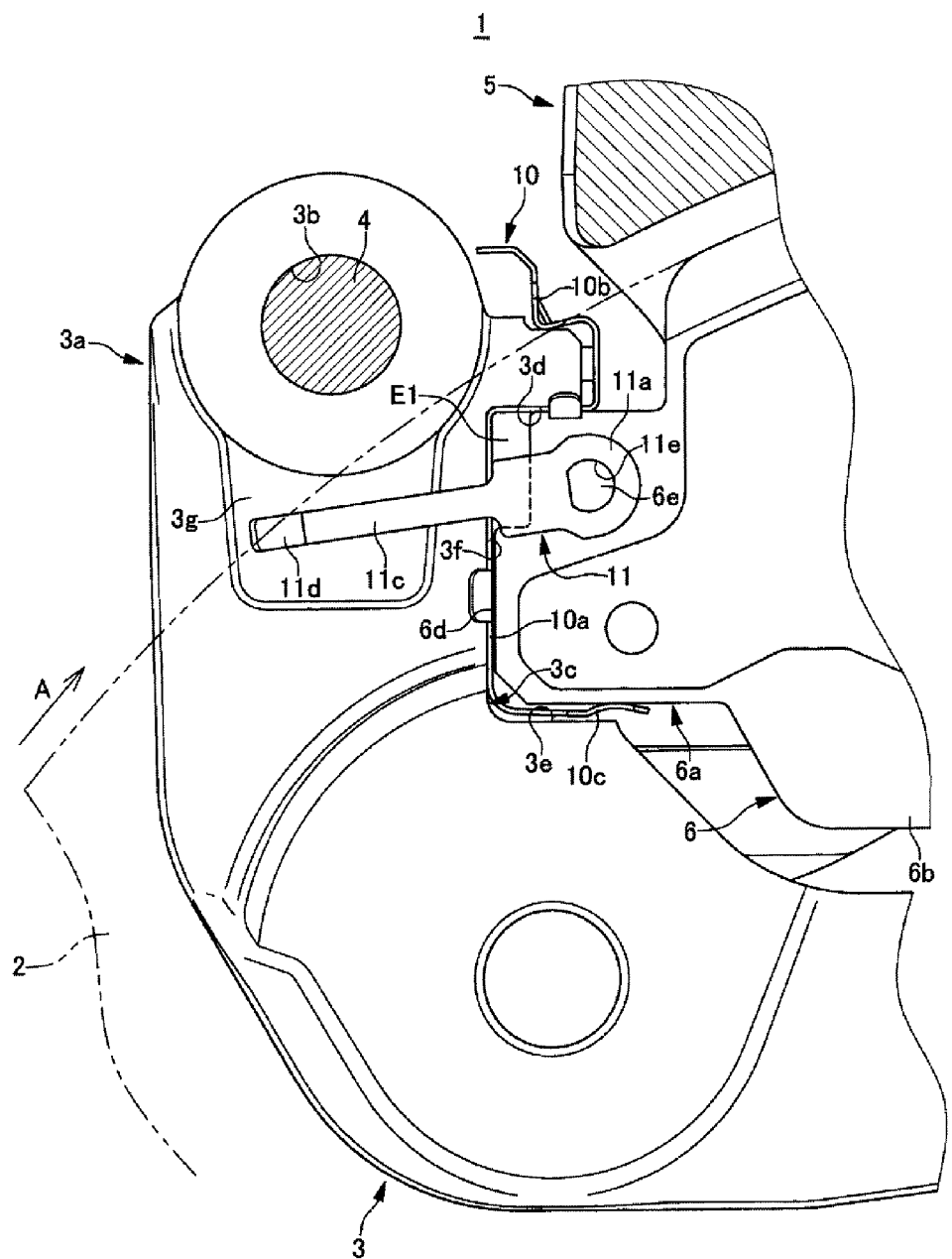
FIG. 1 is a sectional front view of a main part of a disc brake according to Embodiment 1.
Figure 2:
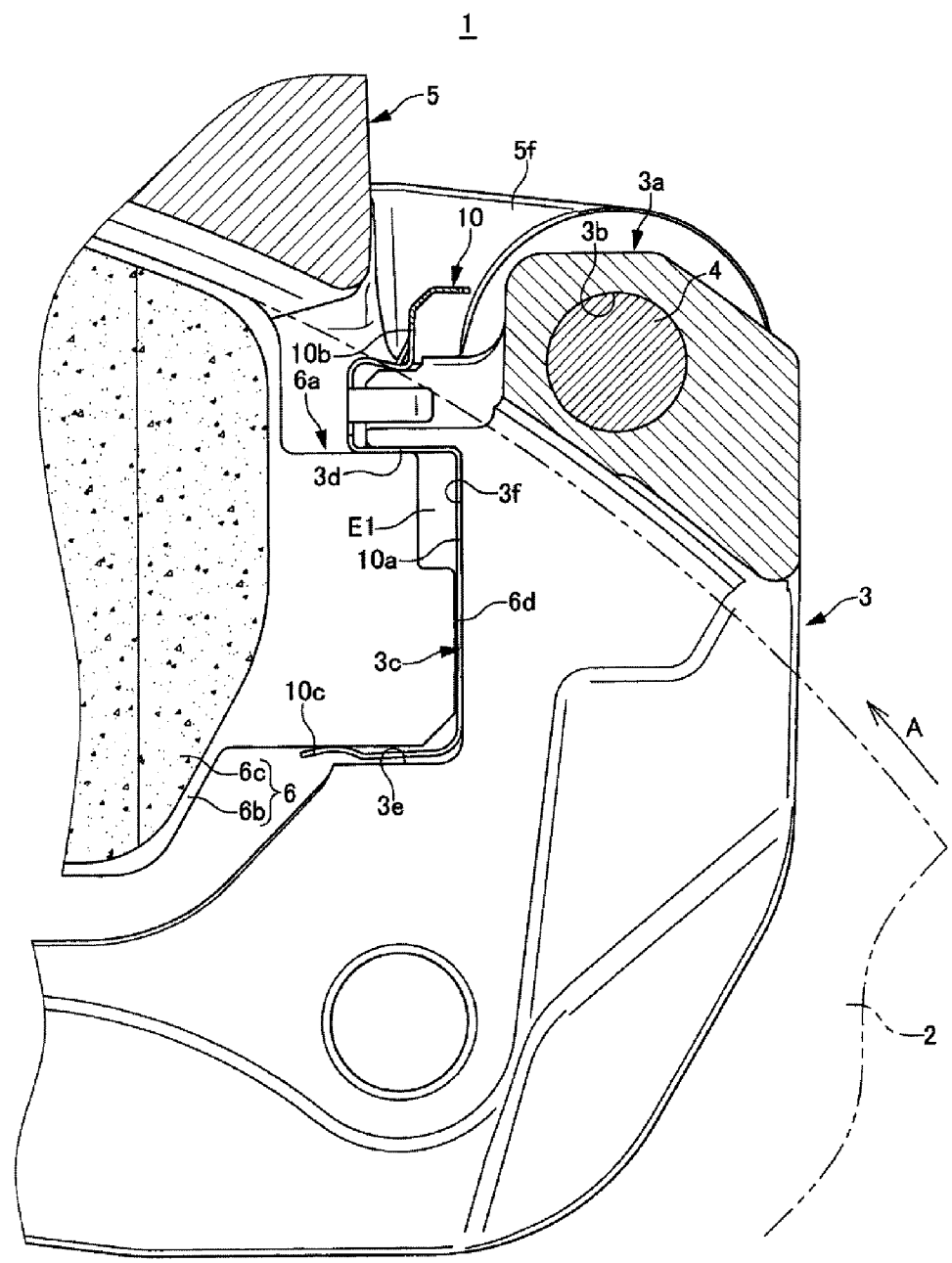
FIG. 2 is a sectional rear view of the main part of the disc brake.
Figure 3:
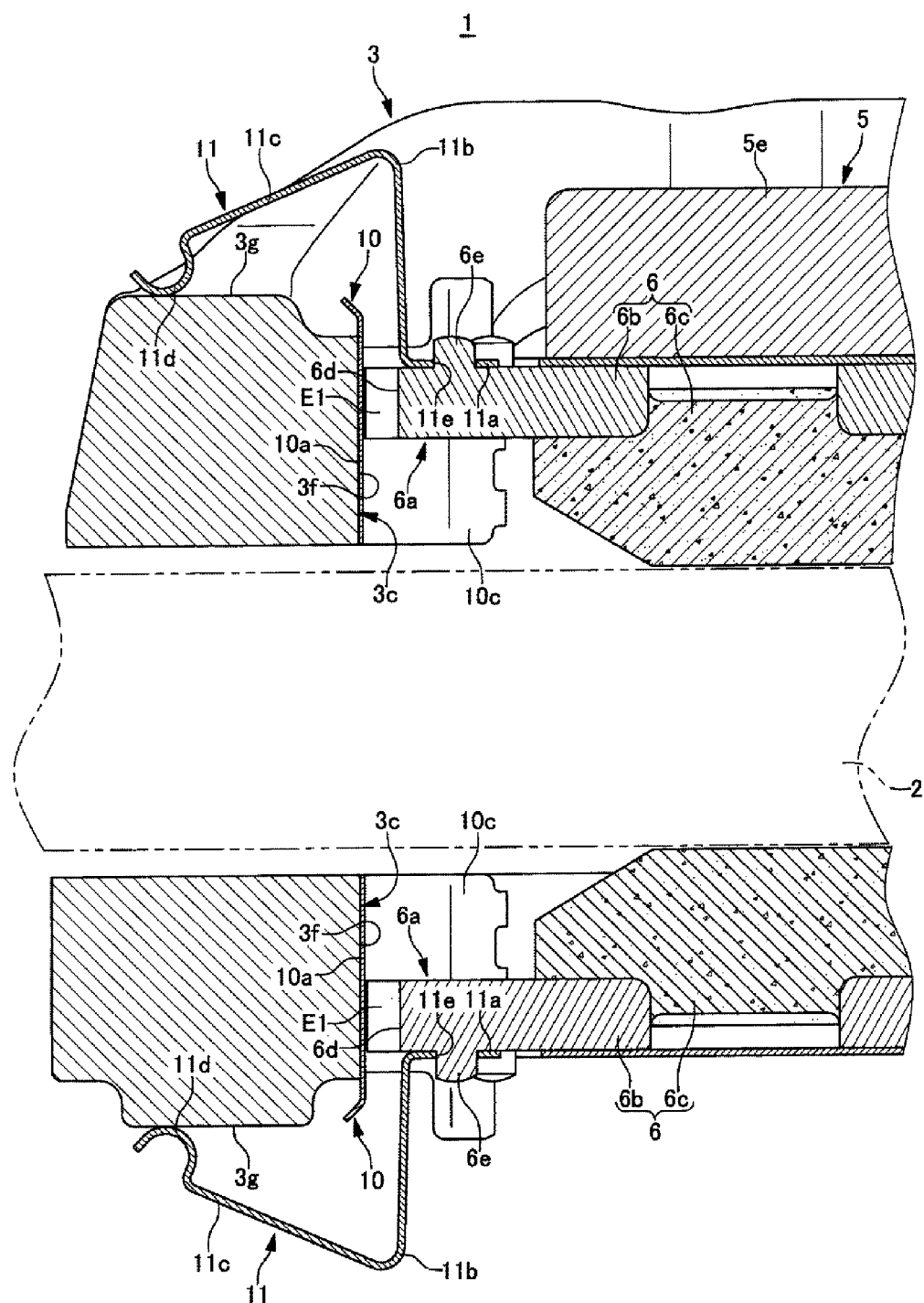
FIG. 3 is a sectional plan view of the disc brake.
Figure 4:
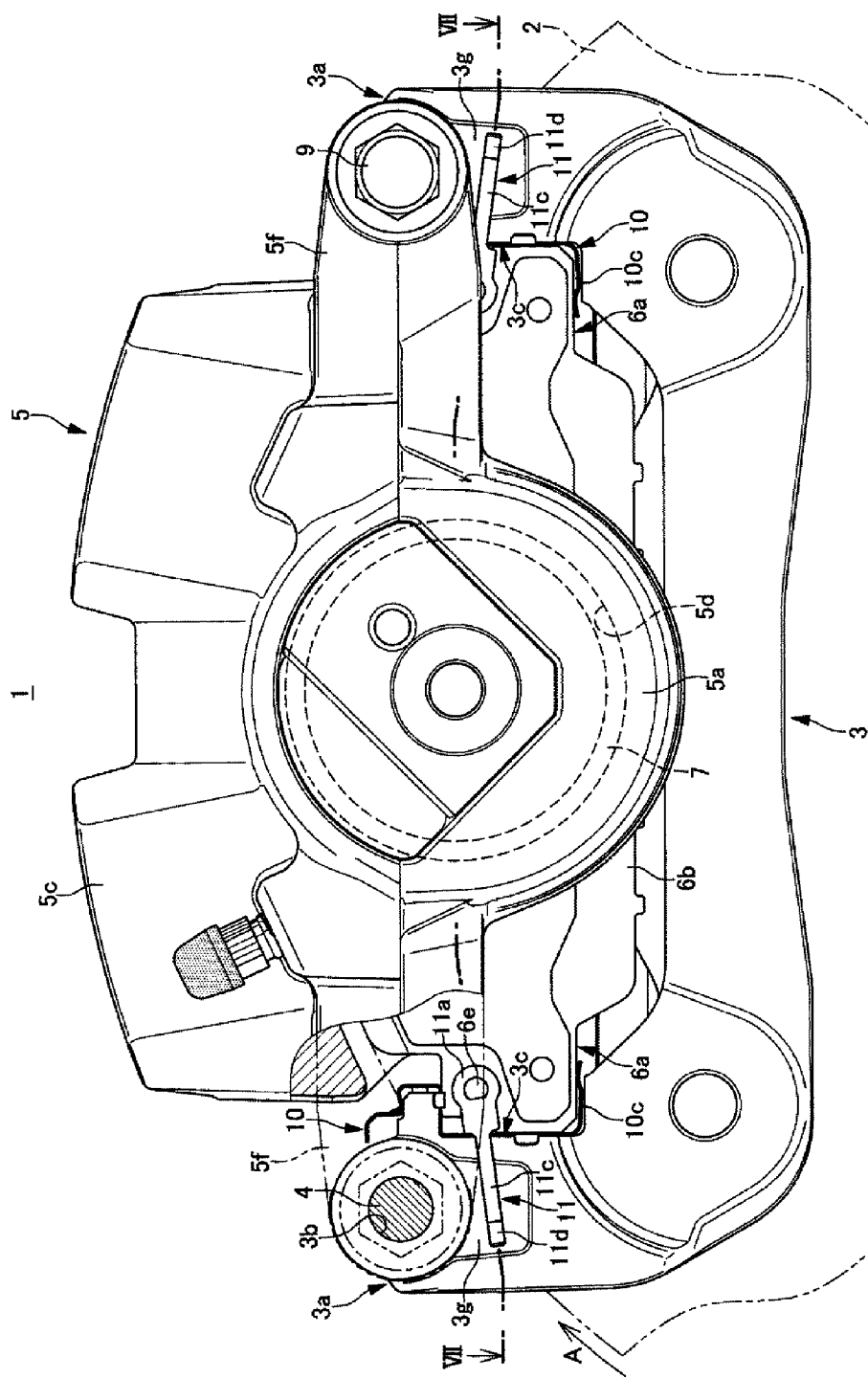
FIG. 4 is a partially sectional front view of the disc brake.

FIGS. 1 to 8 show a vehicle disc brake according to Embodiment 1. In the figures, an arrow A denotes a rotating direction of a disc rotor which rotates together with a wheel when a vehicle travels forwards, and a disc-rotor-exit side and a disc-rotor-entrance side, which will be referred to in the following description, are those when the vehicle travels forwards.

According to Embodiment 1, a disc brake 1 includes a disc rotor 2 which rotates together with a wheel, a caliper bracket 3 which is fixed to a vehicle body on one side portion of the disc rotor 2, a caliper body 5 which is supported on caliper arms 3a, 3a of the caliper bracket 3 so as to move in an axial direction of the disc rotor 2 via a pair of slide pins 4, 4, and a pair of friction pads 6, 6 which are disposed to face each other while holding the disc rotor 2 therebetween inside an acting portion 5a and a reacting portion 5b of the caliper body 5.

The caliper body 5 is made up of the acting portion 5a and the reacting portion 5b described above which are disposed on both sides of the disc rotor 2 and a bridge portion 5c which straddles an outer edge of the disc rotor 2 to connect the acting portion 5a and the reacting portion 5b together. A cylinder bore 5d is provided in the acting portion 5a so as to be opened to a side facing the disc rotor 2. A reacting claw 5e is provided on the reacting portion 5b. A bottomed cylindrical piston 7 is accommodated in the cylinder bore 5d, and the piston 7 is configured to move towards the disc rotor in the cylinder bore 5d by means of a hydraulic pressure supplied to a hydraulic chamber 8 defined at a bottom portion side of the cylinder bore 5d. Vehicle body attaching arms 5f, 5f are provided on a side portion of the acting portion 5a so as to project therefrom, and the slide pins 4, 4, which are described above, are provided at respective distal ends of the vehicle body attaching arms 5f, 5f with attaching bolts 9, 9.

The caliper support arms 3a, 3a extend from side portions of the caliper bracket 3, straddle an outer edge of the disc rotor 2 in the axial direction of the disc rotor 2 while holding sides of the bridge portion 5c therebetween and extend towards a center of the disc rotor along a side wall of the reacting portion 5b at the other side portion of the disc rotor 2.

A guide hole 3b is opened in each caliper arm 3a for accommodation of the slide pin 4 described above. Four pad guide grooves 3c (pad guide portions) are provided in the caliper support arms 3a, 3a in such a manner as to face each other on the side portions of the disc rotor 2. Each pad guide groove 3c has a radially outer surface 3d, a radially inner surface 3e and a confronting surface 3f which connects the radially outer and inner surfaces 3d, 3e together and is then formed into a U-shape. Then, a lug piece 6a of the friction pad 6 is inserted into each pad guide groove 3c via a pad retainer 10.

On each friction pad 6, lug pieces 6a, 6a are provided on both side portions of a backing plate 6b so as to project therefrom, and a lining 6c is affixed to one side surface of the backing plate 6b. The lug piece 6a has a stepped shape at each of end faces 6d, 6d in the rotating direction of the disc rotor 2. In each of the end faces 6d, 6d of the lug piece 6a, a projecting length on a radially outer side is shorter than a projecting length on a radially inner side. An engaging projecting portion 6e is formed at a radially outer side on the other side surface of the lug piece 6a by cutting out a part of a cylindrical projecting portion in the axial direction, and a pad return spring 11 is attached to the engaging projecting portion 6e.

The pad retainer 10 is provided additionally in each of the pad guide grooves 3c, 3c on the sides of the disc rotor 2 at the disc-rotor-entrance side or the disc-rotor-exit side. The pad retainer 10 includes a pair of retainer portions 10a, 10a which guide the lug piece 6a which moves in the axial direction of the disc rotor 2 and a connecting piece 10b which straddles the outer edge of the disc rotor 2 to connect the pair of retainer portions 10a, 10a together. An inner piece 10c of each retainer portion 10a is inclined radially outwards of the disc rotor 2 to bias the lug piece 6a radially outwards of the disc rotor 2, thereby preventing the looseness of the friction pads 6, 6.

The pad return spring 11 is formed by bending a belt-shaped metal plate and includes a locking portion 11a which is attached to the lug piece 6a, a spring portion 11c which is formed by bending back an extending piece which extends from an end portion of a side of the locking portion 11a which lies opposite to a side facing the disc rotor 2 so as to move away from the disc rotor 2 towards the disc rotor 2 via a curved portion 11b and an abutment portion 11d which is provided at a distal end of the spring portion 11c and which is brought into abutment with a side surface 3g of the caliper support arm 3a which lies opposite to a side surface facing the disc rotor 2. An insertion hole 11e having the same shape as a sectional shape of the engaging projecting portion 6e is formed in the locking portion 11a, and the abutment portion 11d is formed into an arc-like shape whose side facing the caliper bracket becomes convex.

The pad return spring 11 which is formed in the way described above is assembled to the lug piece while prevented from rotating with the insertion hole 11e passed on the engaging projecting portion 6e of the lug piece 6a to thereby clamp the engaging projecting portion 6e. The friction pad 6 with the pad return springs 11, 11 attached to the corresponding lug pieces 6a, 6a is assembled in such a way that the lug pieces 6a, 6a are inserted into the corresponding pad guide grooves 3c, 3c to which the pad retainers 10, 10 are attached individually from the side facing the disc rotor 2 and that the abutment portion 11d is brought into abutment with the side surface 3g of the caliper support arm 3a which lies opposite to the disc rotor 2, and a space portion E1 is defined between the radially outer side of the lug piece 6a and the pad guide groove 3c.

Figure 5:
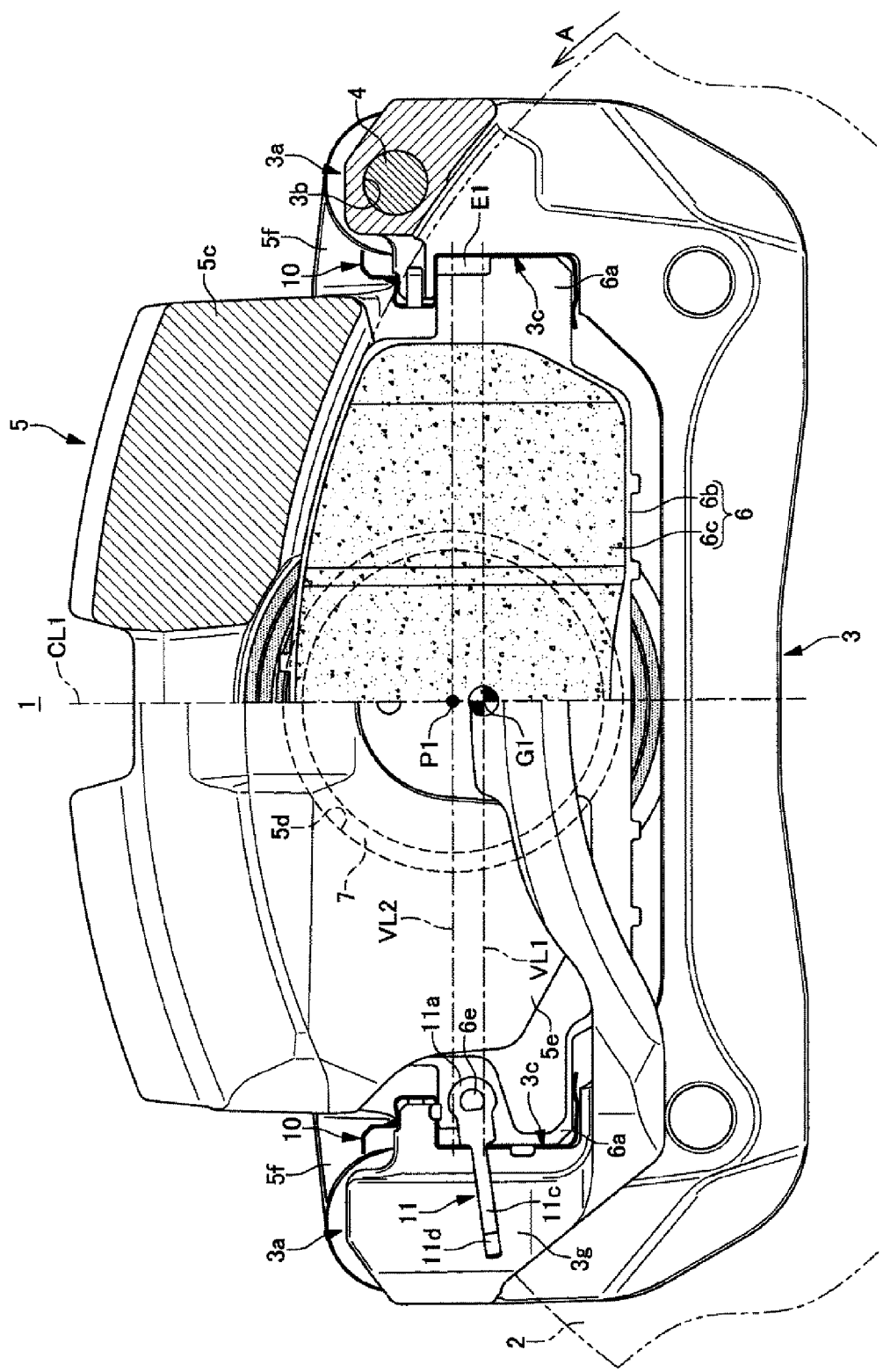
FIG. 5 is a partially sectional rear view of the disc brake.
Figure 6:
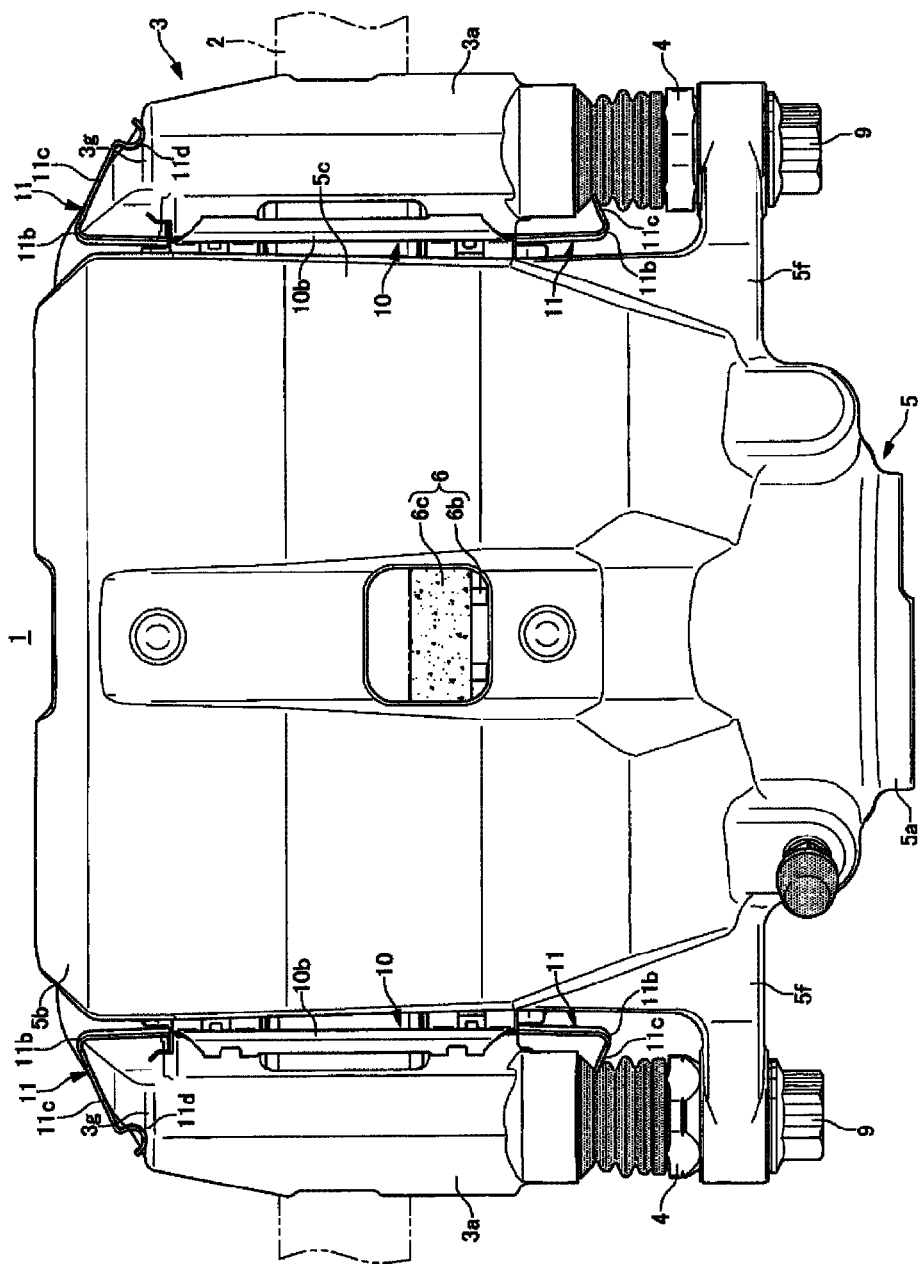
FIG. 6 is a plan view of the disc brake.
Figure 7:
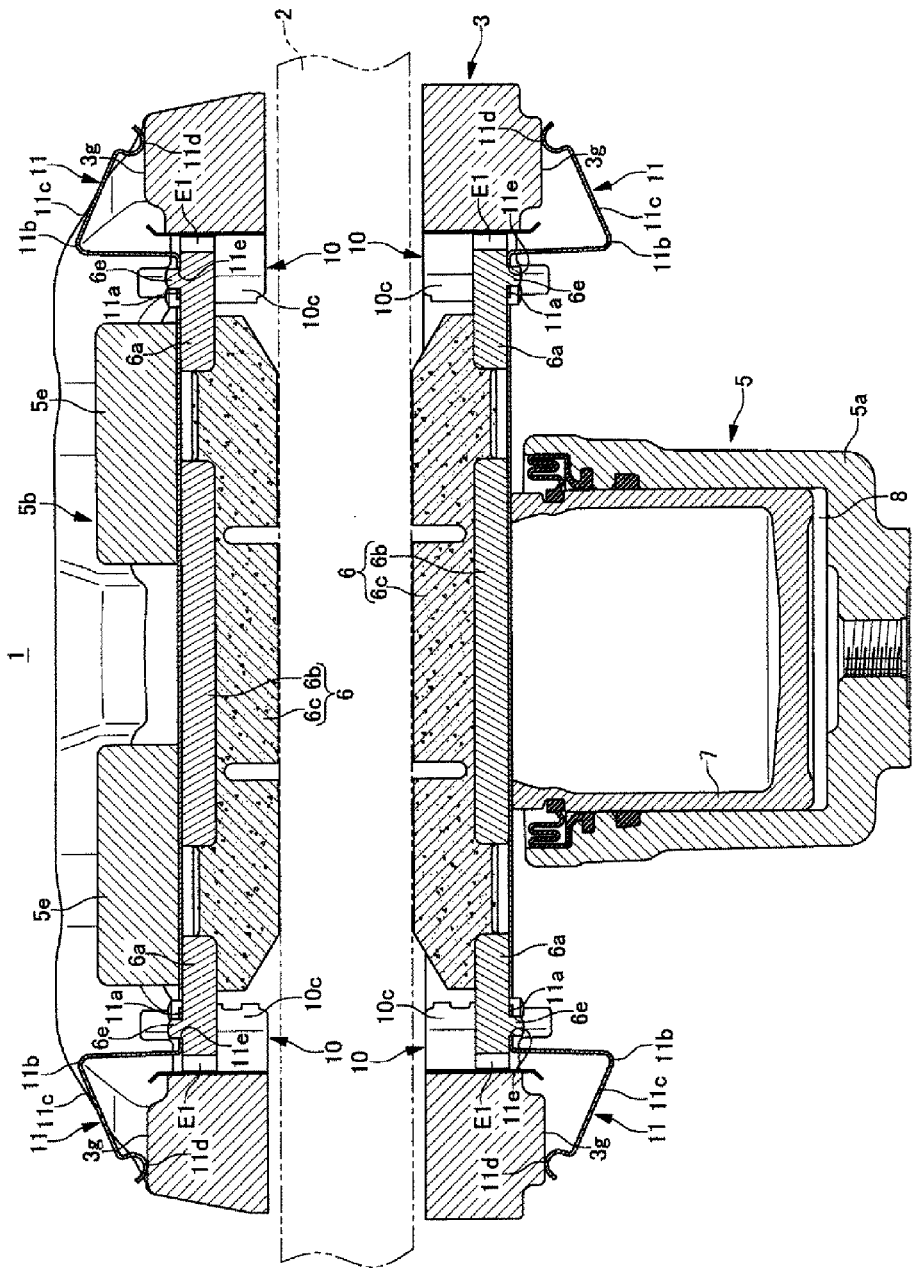
FIG. 7 is a sectional view taken along a line VII-VII in FIG. 4.
Figure 8:
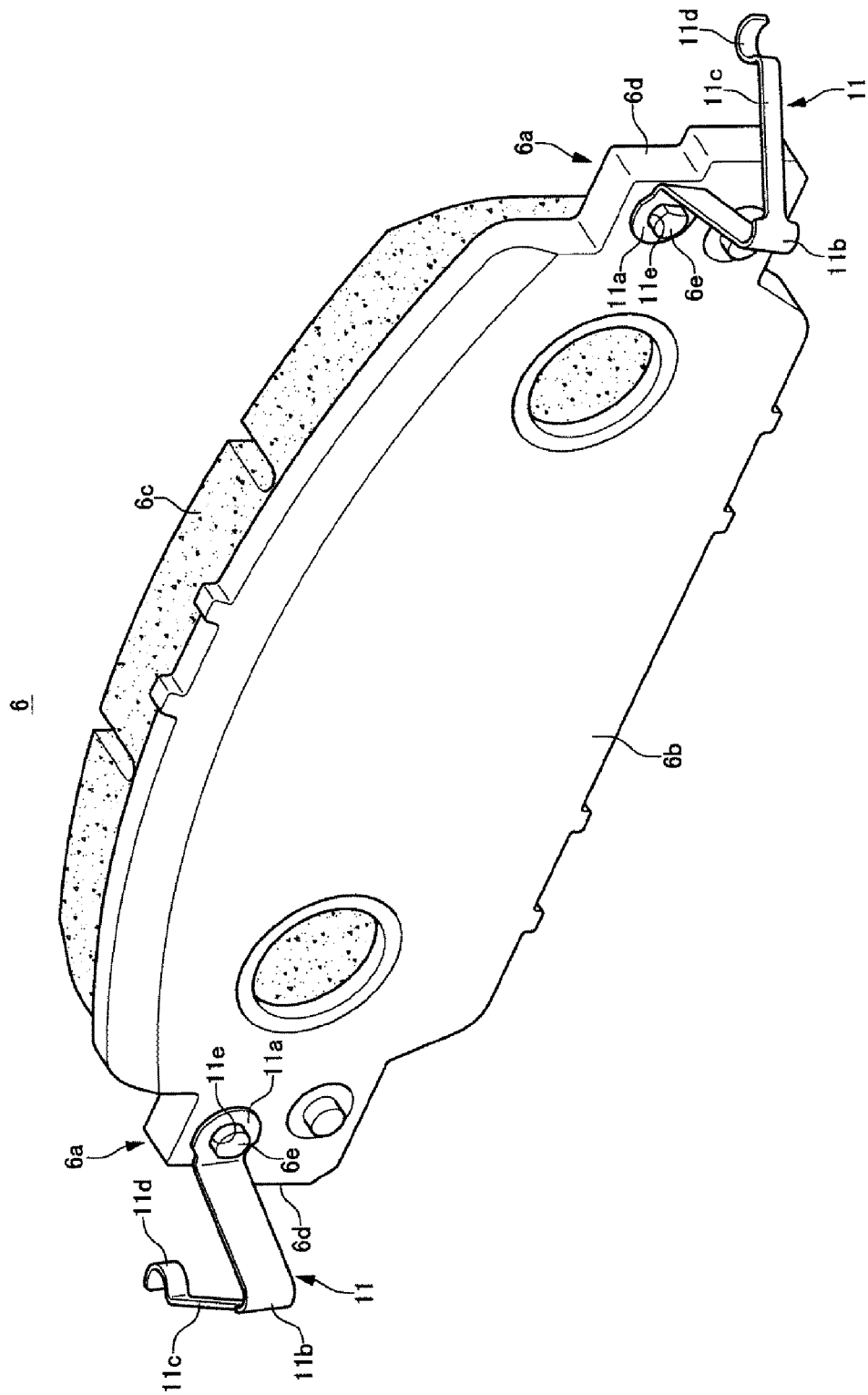
FIG. 8 is a perspective view of a friction pad according to Embodiment 1.
Figure 9:
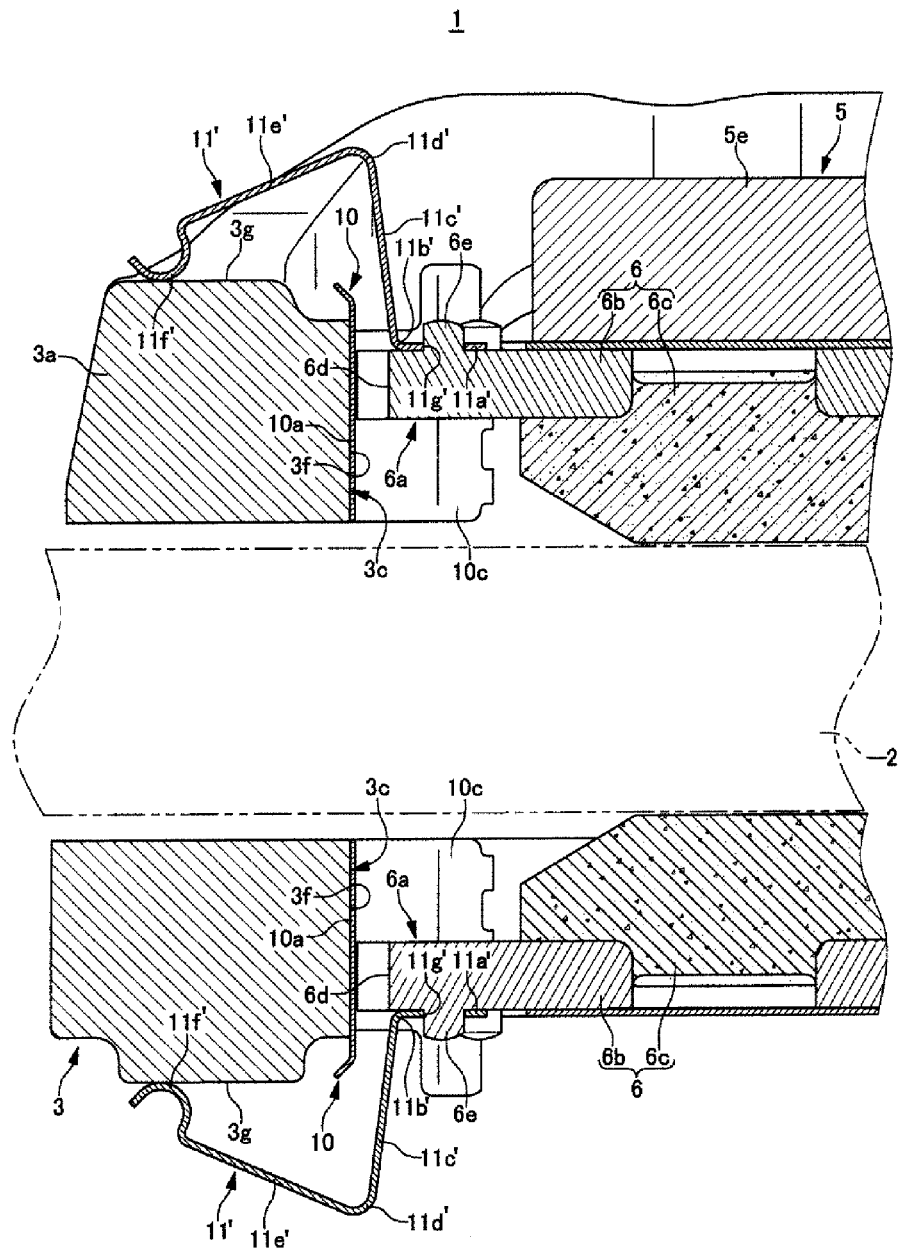
FIG. 9 is a sectional plan view of a main part of a vehicle disc brake according to Embodiment 2.
Figure 10:
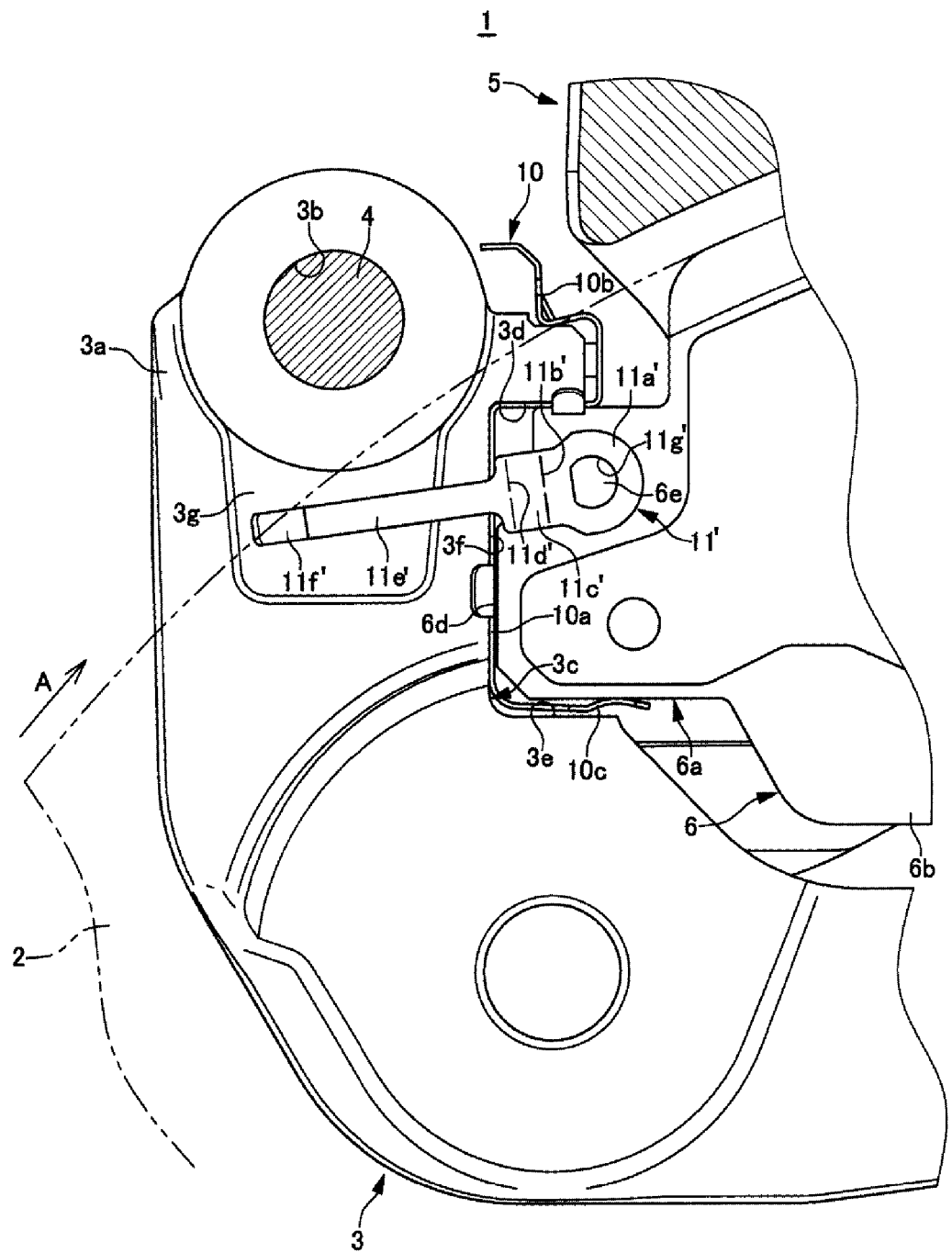
FIG. 10 is a sectional front view of the main part of the vehicle disc brake.
Figure 11:
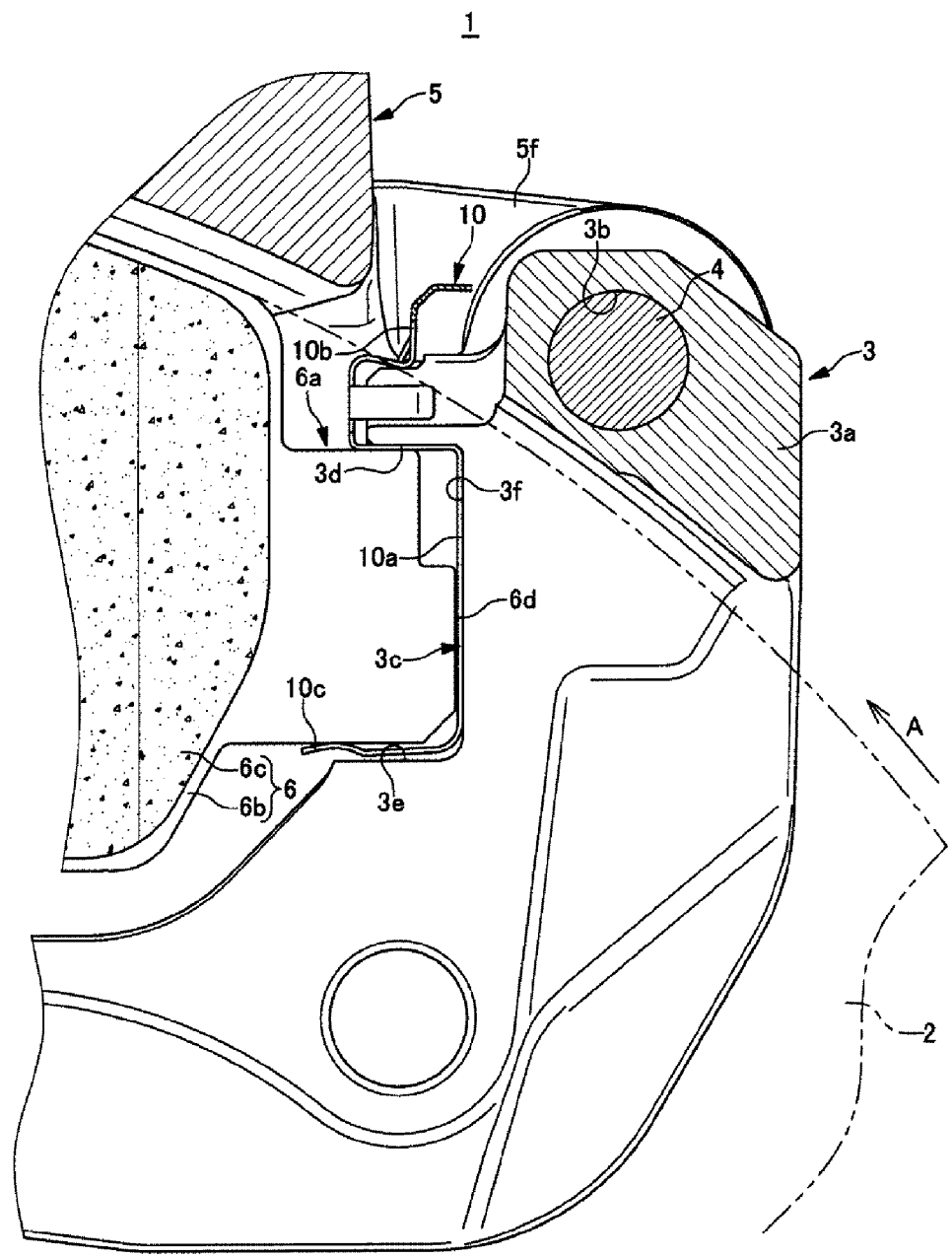
FIG. 11 is a sectional rear view of the main part of the vehicle disc brake.
Figure 12:
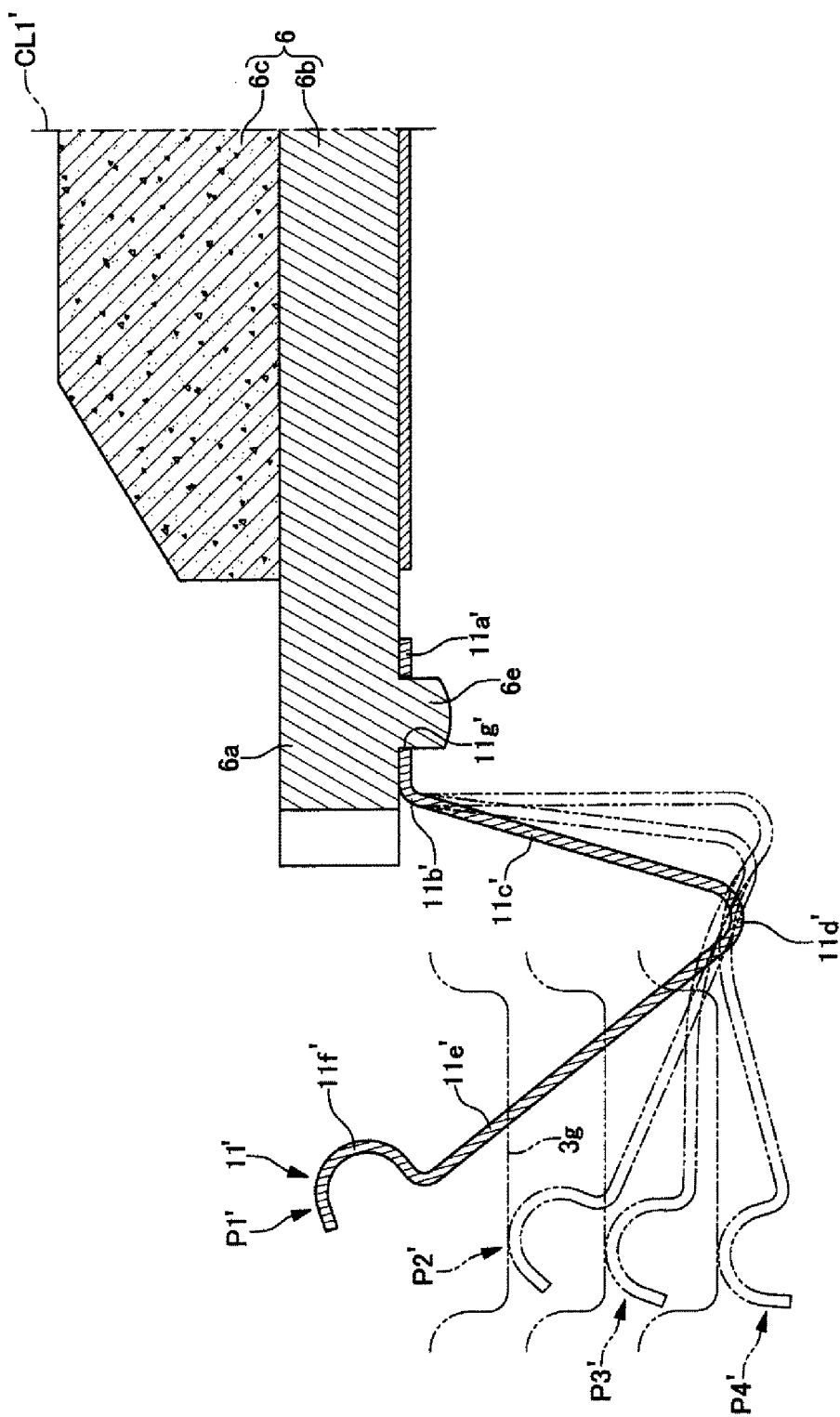
FIG. 12 is a sectional view illustrating the displacement of a pad return spring.
Figure 13:
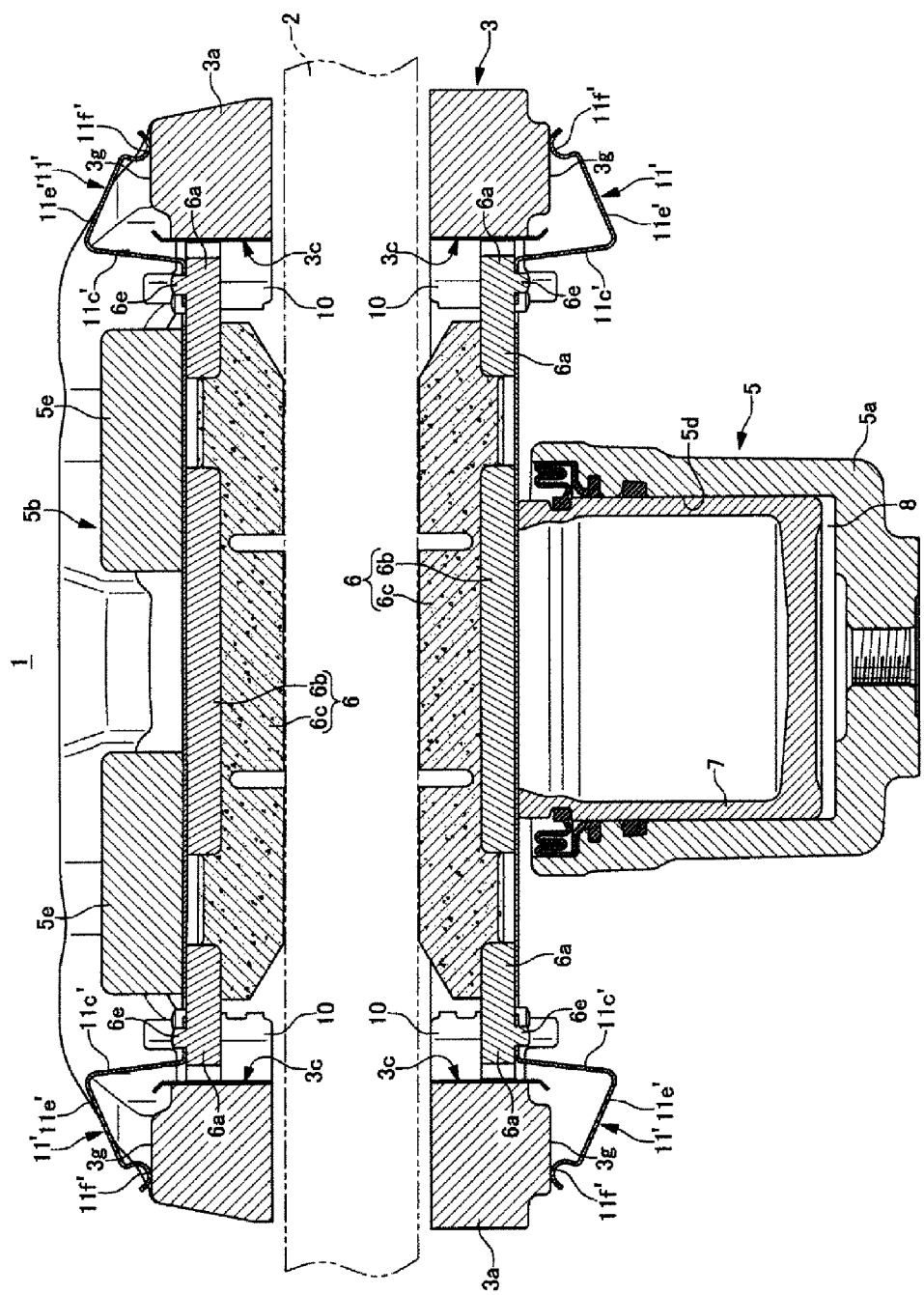
FIG. 13 is a sectional plan view of the vehicle disc brake.
Figure 14:
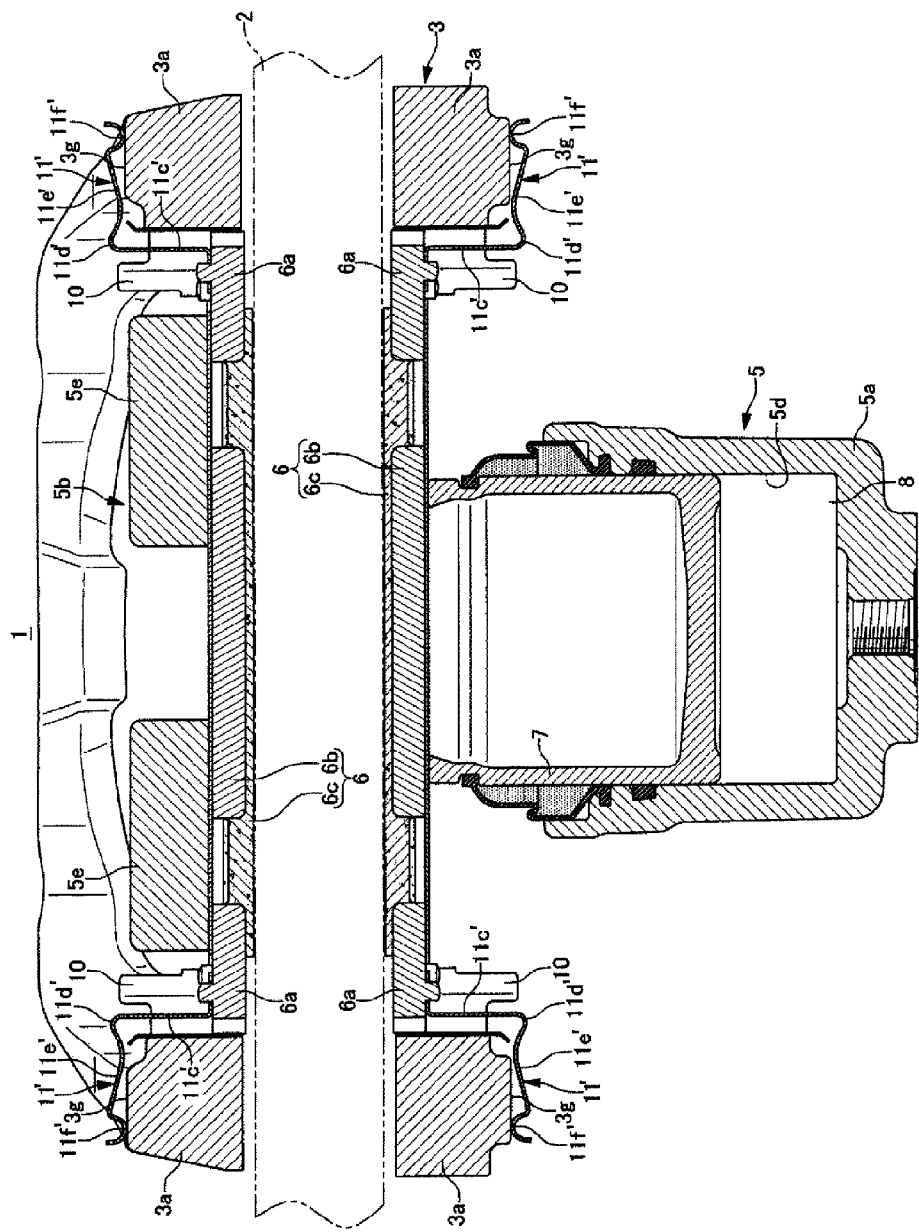
FIG. 14 is a sectional plan view of the vehicle disc brake showing a state occurring just before a friction pad is fully worn up.
Figure 15:
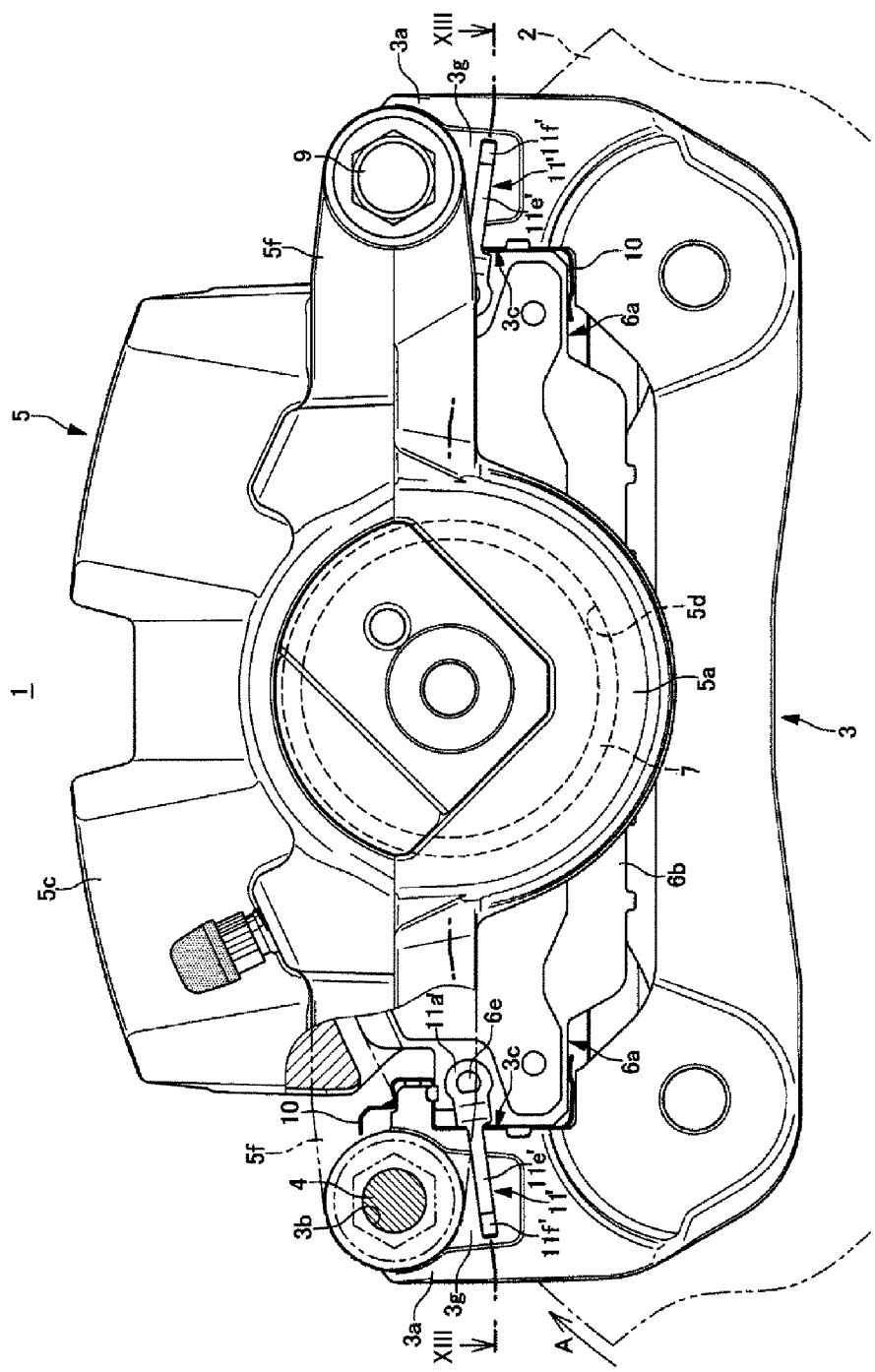
FIG. 15 is a front view of the vehicle disc brake according to Embodiment 2.
Figure 16:
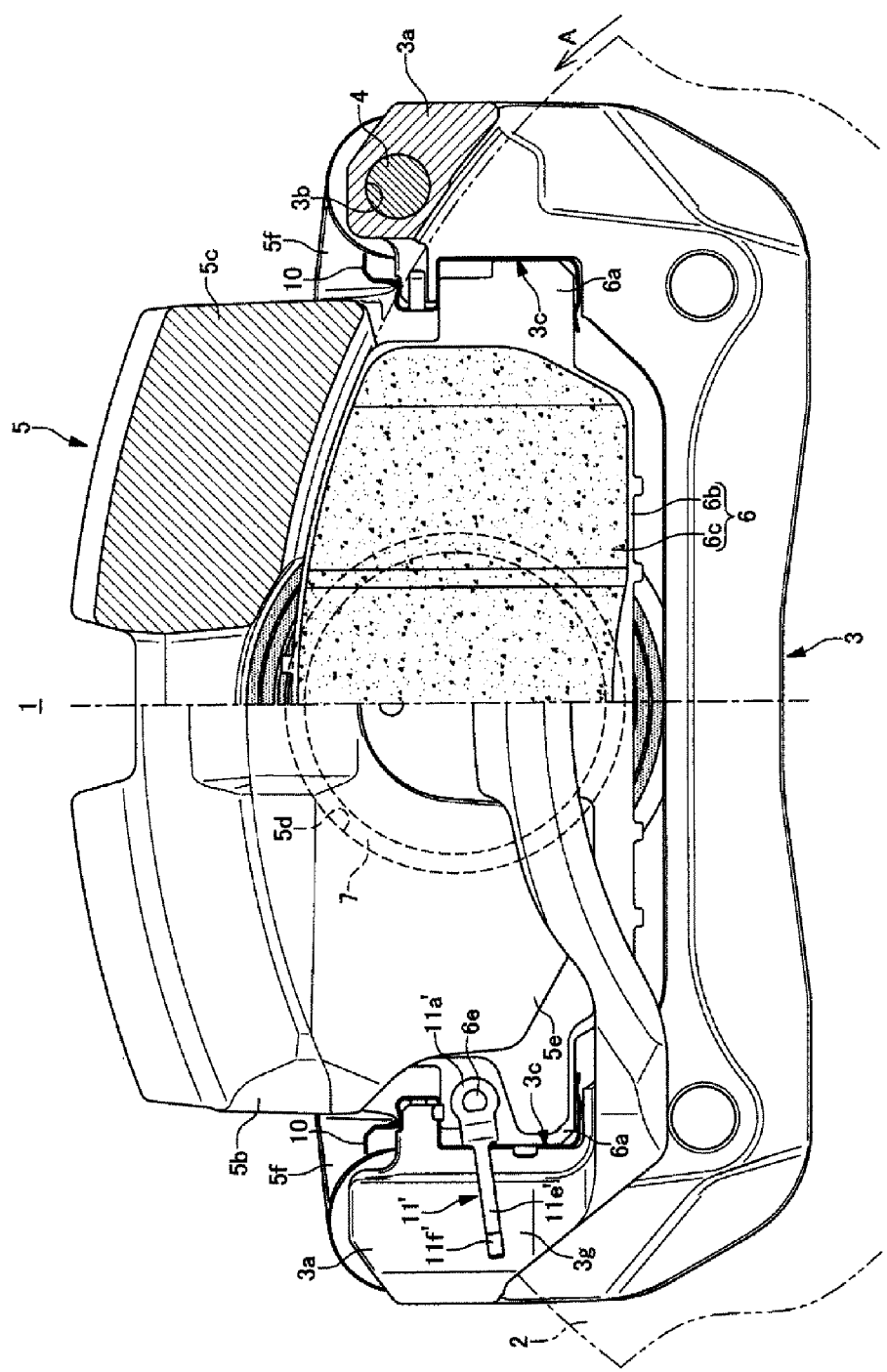
FIG. 16 is a partially sectional rear view of the vehicle disc brake.
Figure 17:
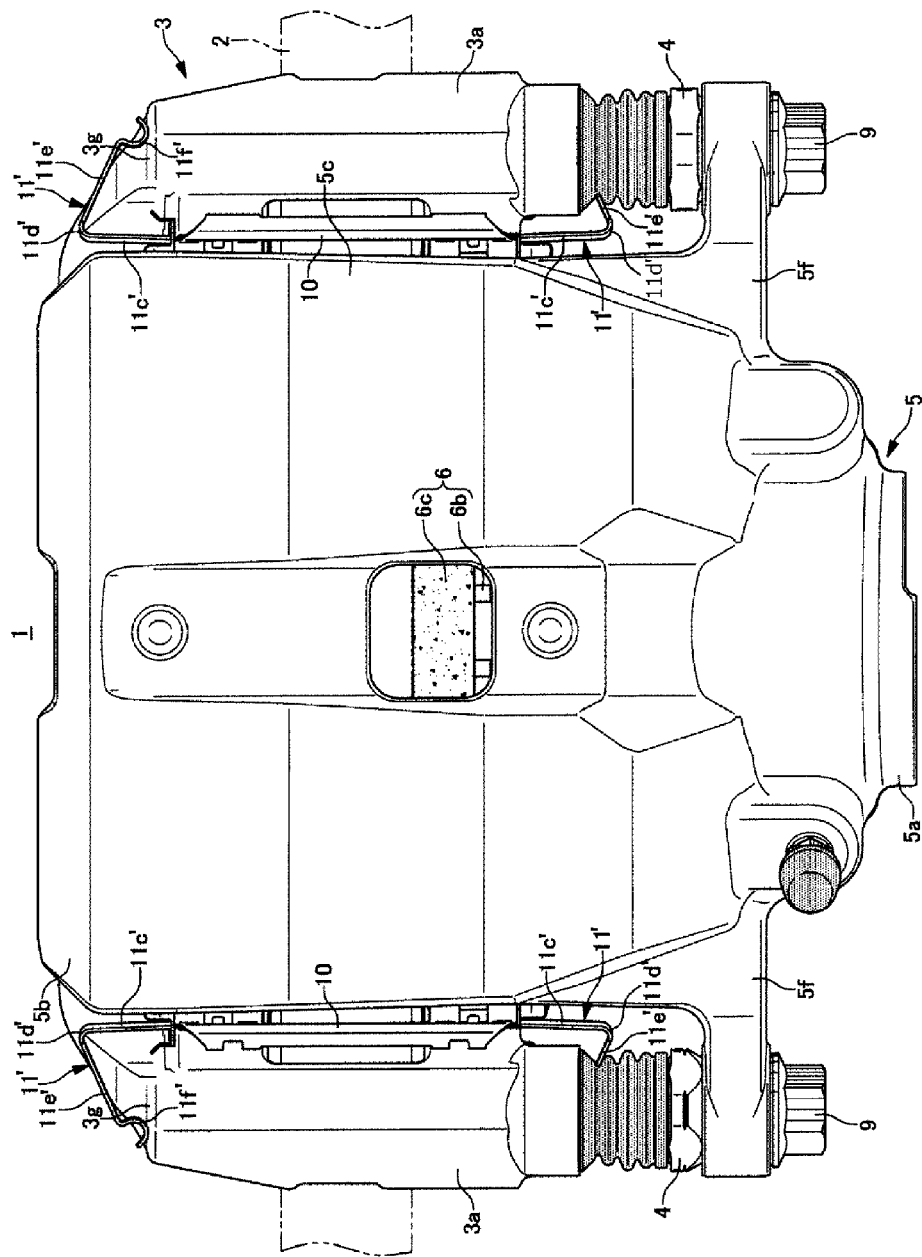
FIG. 17 is a plan view of the vehicle disc brake.
Figure 18:
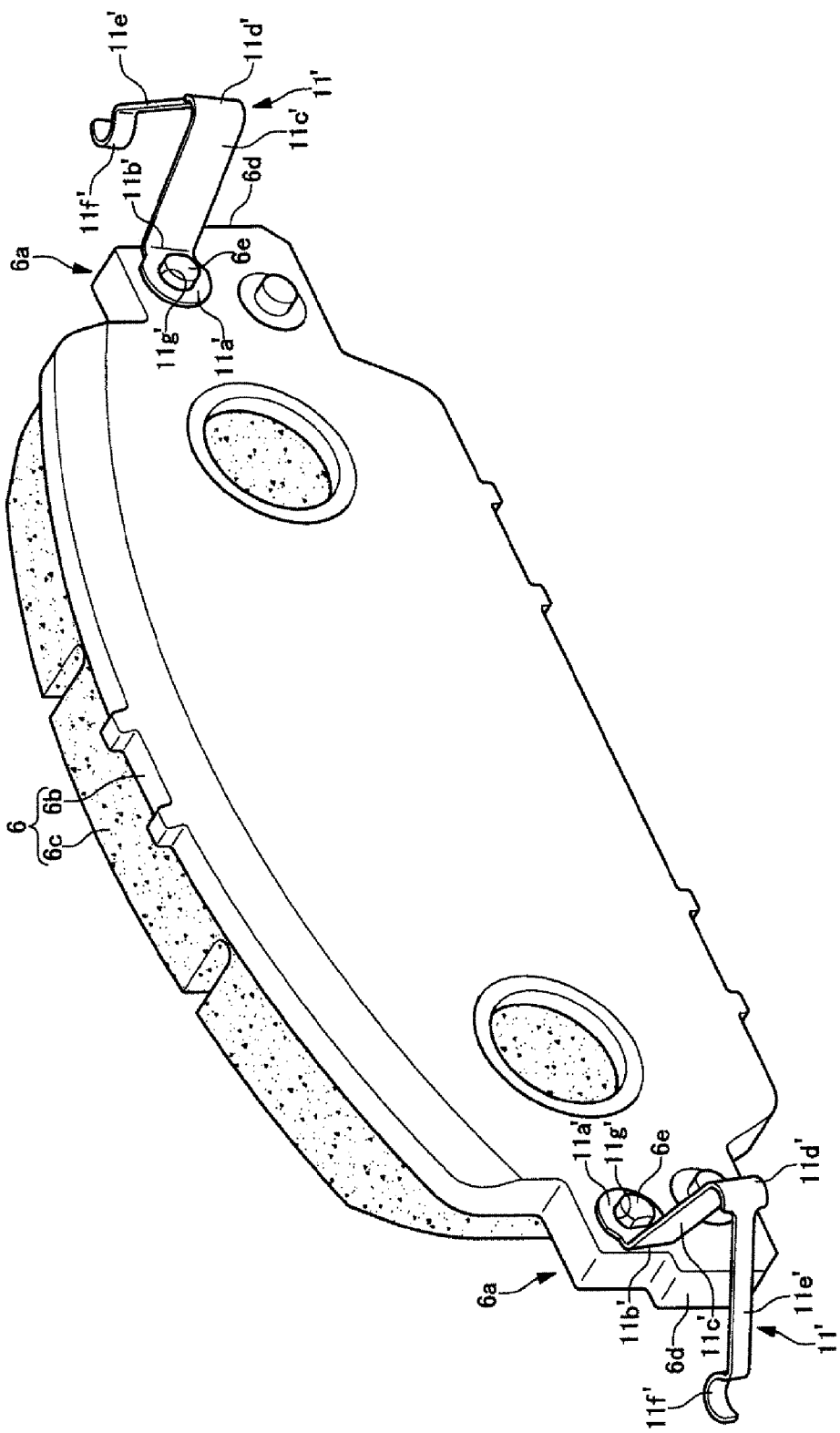
FIG. 18 is a perspective view of the friction pad of Embodiment 2 to which the pad return springs are assembled.

As shown in FIG. 5, the space portion E1 is disposed in a position where a first imaginary line VL1 passes which passes a gravity center G1 of the friction pad 6 and which intersects perpendicularly a center line CL1 which connects a center of the disc rotor 2 with a center P1 of the piston 7 and in a position where a second imaginary line VL2 that passes the center P1 of the piston 7 and intersects perpendicularly the center line CL1. The locking portion 11a of the pad return spring 11 is disposed in a position where the first imaginary line VL1 passes.

In the disc brake 1 which is configured in the way described above, when a working fluid which is pressurized as a result of the driver operating a brake pedal is supplied into the hydraulic chamber 8, the piston travels forwards in the cylinder bore 5d to press the friction pad 6 on the acting portion 5a side against one side surface of the disc rotor 2. Next, the caliper body 5 moves in the direction of the acting portion while guided by the slide pins 4, 4 by means of a reaction force produced as a result of the friction pad 6a on the acting portion 5 side being pressed against the one side surface of the disc rotor 2, whereby the reacting claw 5e presses the friction pad 6 on the reacting portion side against the other side surface of the disc rotor 2.

As this occurs, in the friction pad 6, due to the braking torque, a force attempting to depress the friction pad 6 radially inwards is exerted on the disc-rotor-exit side and a force attempting to lift the friction pad 6 radially outwards is exerted on the disc-rotor-entrance side. As this occurs, due to the space portion E1 being disposed between the lug piece 6a and the pad guide groove 3c to lie over the position where the first imaginary line VL1 passes and the position where the second imaginary line VL2 passes, the force depressing the disc-rotor-exit side of the friction pad 6 is promoted, and the radially inner side of the lug piece 6a at the disc-rotor-exit side is pressed strongly against the radially inner side surface 3e of the pad guide groove 3c against the spring force of the inner piece 10d of the retainer portion 10a. In association with this, the radially outer side of the lug piece 6a at the disc-rotor-entrance side is pressed strongly against the radially outer surface 3d of the pad guide groove 3c, whereby the lug piece 6a is fixed within the pad guide groove 3c, thereby restricting the generation of brake noise or squeal. As this occurs, in the pad return spring 11, the spring portion 11c is deformed in a direction in which the spring portion 11 moves away from the lug piece 6a in association with the friction pad 6 being pressed against the side surface of the disc rotor 2.

On the other hand, when the brake applied in the way described above is released, causing the piston 7 and the reacting claw 5e to withdraw to their positions taken when the brake is started to be applied, the spring portion 11c of the pad return spring 11 attempts to restore its initial shape, and therefore, the lug pieces 6a, 6a are pressed so as to move away from the disc rotor 2 via the locking portion 11a, so that the friction pads 6 are caused forcibly to move away from the corresponding side surfaces of the disc rotor 2. This can prevent the dragging of the friction pads 6.

In Embodiment 1, the lug pieces 6a, 6a of the friction pad 6 are fixed in place in the bad guide grooves 3c, 3c in an ensured fashion when the brake is applied, whereby the generation of brake noise or squeal can be restricted. The spring portion of the pad return spring is not disposed in the space portion E1 defined between the lug piece 6a and the pad guide groove 3c, which is the case with the exemplary vehicle disc brake. The pad return spring 11 of Embodiment 1 has only the spring force which biases the friction pad 6 so as to move away from the disc rotor 2 when the brake is released, and therefore, there are no fears that the pad return spring 11 interrupts the fixing of the lug piece 6a in place in the pad guide groove when the brake is applied. The locking portion 11a of the pad return spring 11 is disposed in the position where the first imaginary line VL1 passes, and therefore, the friction pad 6 is pulled back in a horizontal direction by means of the spring force of the pad return spring 11 so that the friction pad 6 can move away from the side surface of the disc rotor 2, thereby preventing the wear of the lining 6c.

The disc brake of the invention is not limited to Embodiment 1. The configuration of the locking portion of the pad return spring is arbitrary, and hence, a configuration may be adopted in which a locking portion is formed into a U-shape so that a lug piece is engaged while being held therein. In Embodiment 1, the gravity center of the friction pad lies further radially inwards than the center of the piston. However, the center of the piston and the gravity center of the friction pad may overlap. The shapes of the other portions of the friction pad than the lug piece are arbitrary, as long as the friction pad includes the lug pieces. The shape of the caliper body is also arbitrary.

Embodiment 2

FIGS. 9 to 18 show a vehicle disc brake according to Embodiment 2. Like reference numerals will be given to like constituent elements to those of Embodiment 1, and the detailed description thereof will be omitted.

In Embodiment 2, a pad return spring is different from Embodiment 1.

The pad return spring 11' includes a locking portion 11a' which is locked on the lug piece 6a, a first extending piece 11c' which extends from the locking portion 11a' so as to move away from the disc rotor 2 towards the disc rotor 2 via a first curved portion 11b', a second extending piece 11e' which is formed by bending back a distal end portion of the first extending piece 11c' towards the disc rotor 2 via a second curved portion 11d' and an abutment portion 11f' which is provided at a distal end of the second extending piece 11e' and which is brought into abutment with a side surface 3g of the caliper support arm 3a which lies opposite to a side surface facing the disc rotor 2. An insertion hole 11g' having the same shape as a sectional shape of the engaging projecting portion 6e is formed in the locking portion 11a'. A width of the second extending piece 11e' is made narrower than a width of the first extending piece 11c', and the abutment portion 11f' is formed into an arc-like shape whose side facing the caliper bracket becomes convex.

The pad return spring 11' is assembled to the lug piece while being prevented from rotating by causing the insertion hole 11g' to fit on the locking projecting portion 6e of the lug piece 6a and clamping the engaging projecting portion 6e. When the pad return spring 11' is left free, the first extending piece 11c' is gradually inclined outwards of the friction pad from the first curved portion 11b' towards the second curved portion 11d' (P1' in FIG. 12). The lug pieces 6a, 6a of the friction pad 6 are inserted into the pad guide grooves 3c, 3c to which the pad retainers 10, 10 are attached, and the abutment portions, are brought into abutment with the side surfaces 3g, 3g of the caliper support arms 3a, 3a which lie opposite to the side surfaces facing the disc rotor 2, whereby the friction pad 6 is assembled to the guide grooves 3c, 3c. As this occurs, the first extending piece 11c' comes near to a state in which the first extending piece becomes parallel to an axis CL1' of the disc rotor 2 from the inclined state (P2' in FIG. 12).

In the disc brake 1 configured in the way described above, when a hydraulic fluid pressurized by the driver who performs a braking operation or depresses the brake pedal is supplied into the hydraulic chamber 8, the piston 7 travels forwards in the cylinder bore 5d, whereby the friction pad 6 on the acting portion 5a side is pressed against one side surface of the disc rotor 2. Next, the caliper body 5 moves in the direction of the acting portion 5a while being guided by the slide pins 4, 4 by means of a reaction force generated as a result of the friction pad 6 on the acting portion 5a side being pressed against the one side surface of the disc rotor 2, whereby the reacting force claw 5e presses the friction pad 6 on the reacting portion side against the other side surface of the disc rotor 2. On the other hand, when the brake applied is released, the piston 7 and the reacting claw 5e retreat to their initial positions at the start of braking.

As this occurs, although the pad return spring 11' is displaced as the friction pad 6 moves in the axial direction of the disc rotor 2, in an initial stage of braking, the first extending piece 11c' is displaced so as to come near to a state in which the first extending piece 11c' become parallel to the axis CL1' of the disc rotor 2 via the first curved portion 11b', and the second extending piece 11e' is displaced so as to come near to a state in which the second extending piece 11e' becomes parallel to the friction pad 6 via the second curved portion 11d'. Thus, a biasing force attempting to press the friction pad 6 so as to move away from the disc rotor 2 is generated by both the first extending piece 11c' and the second extending piece 11e'. As the friction pad 6 moves towards the disc rotor 2, the first extending piece 11c' comes nearer to the state in which the first extending piece 11c' becomes parallel to the axis CL1' of the disc rotor 2, whereby the displace amount thereof gradually decreases, while the biasing force based on the displacement of the second extending piece 11e' increases mainly, thereby pressing the friction pad 6 so as to move away from the disc rotor 2 (P3' in FIG. 12).

In a state occurring just before the lining 6c is fully worn up, the backing plate 6b of the friction pad 6 lies near to the disc rotor 2, whereby when the increase in biasing force of the first extending piece 11c' gradually decreases, while the second extending piece 11e' is mainly loaded in the pad return spring 11' with the brake applied, the second extending piece 11e' is gradually curved so as to project towards the disc rotor 2, whereby the biasing force is increased. In this way, the pad return spring 11' exhibits the characteristics of a so-called non-linear characteristic spring, and the biasing force increases moderately as the backing plate 6b comes near to the disc rotor 2, whereby there is no such situation that the friction pad 6 is caused to retreat greatly when the brake is released, which would be the case with the exemplary vehicle disc brake, thereby maintaining a good braking or brake pedal operation feeling. Due to the width of the second extending piece 11e' being made narrow, the space for installation of the pad return spring 11' can be saved (P4' in FIG. 12 and FIG. 14).

Embodiment 3

Figure 19:
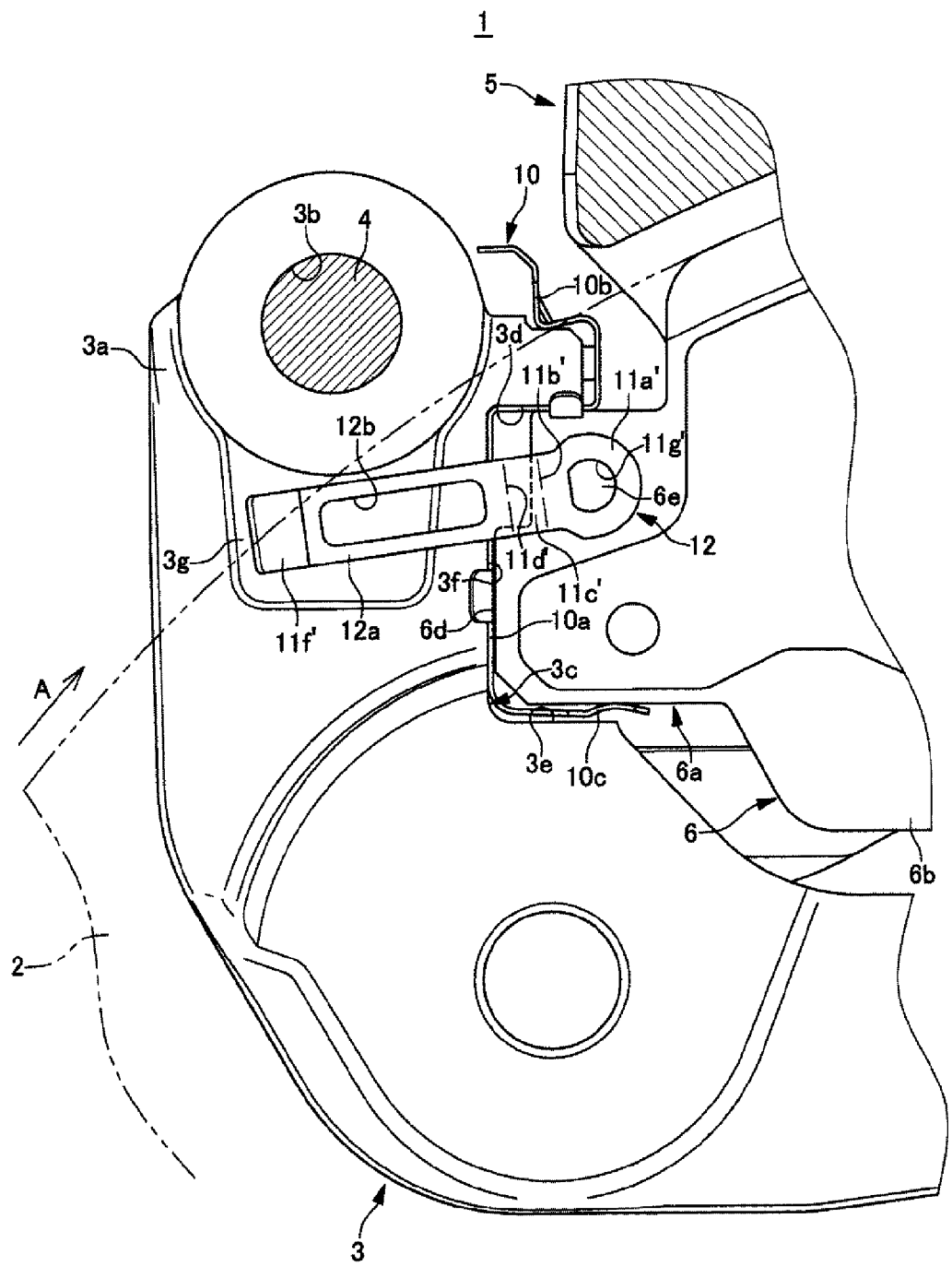
FIG. 19 is a sectional front view of a main part of a vehicle disc brake according to Embodiment 3.
Figure 20:
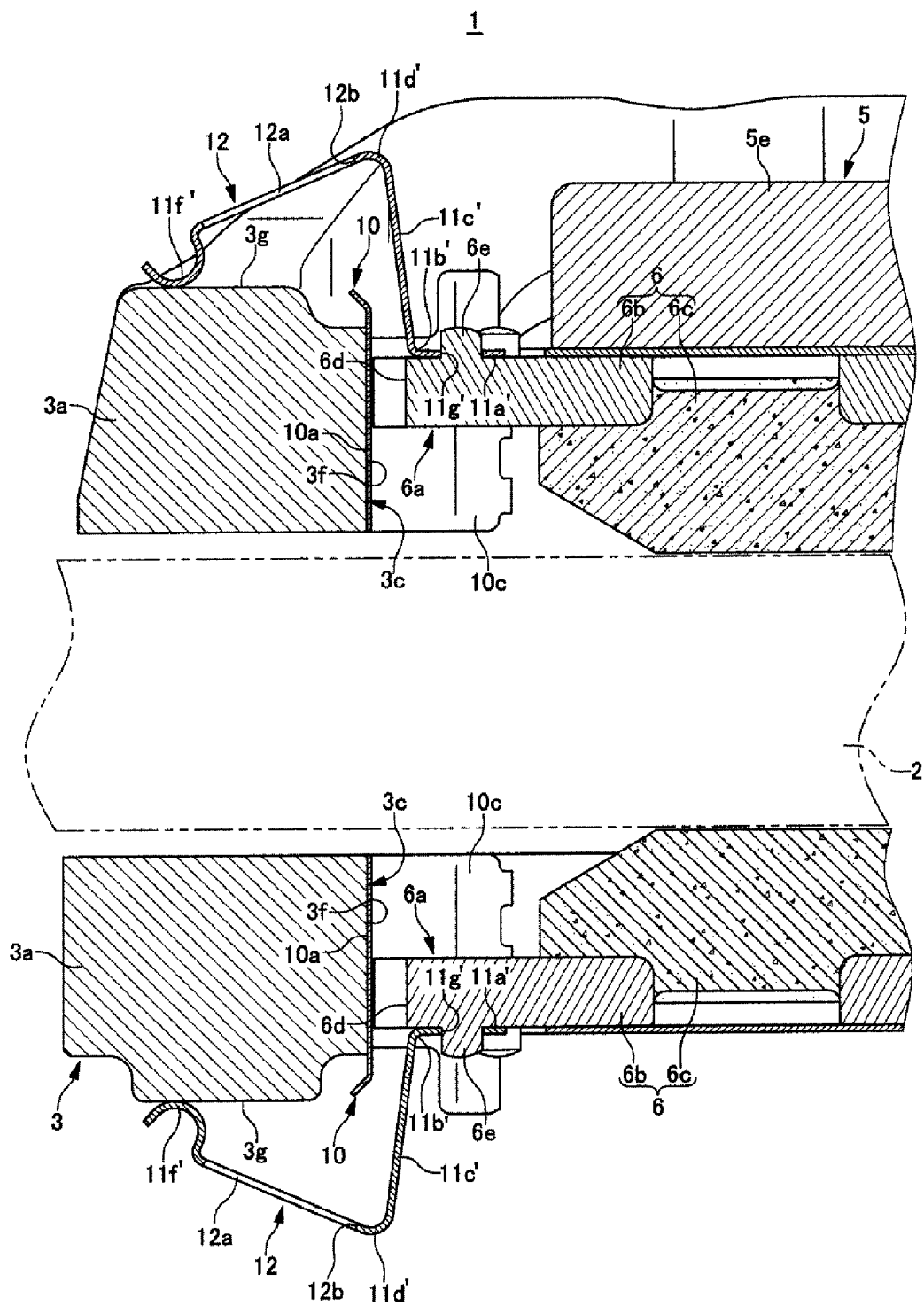
FIG. 20 is a sectional plan view of the main part of the vehicle disc brake.
Figure 21:
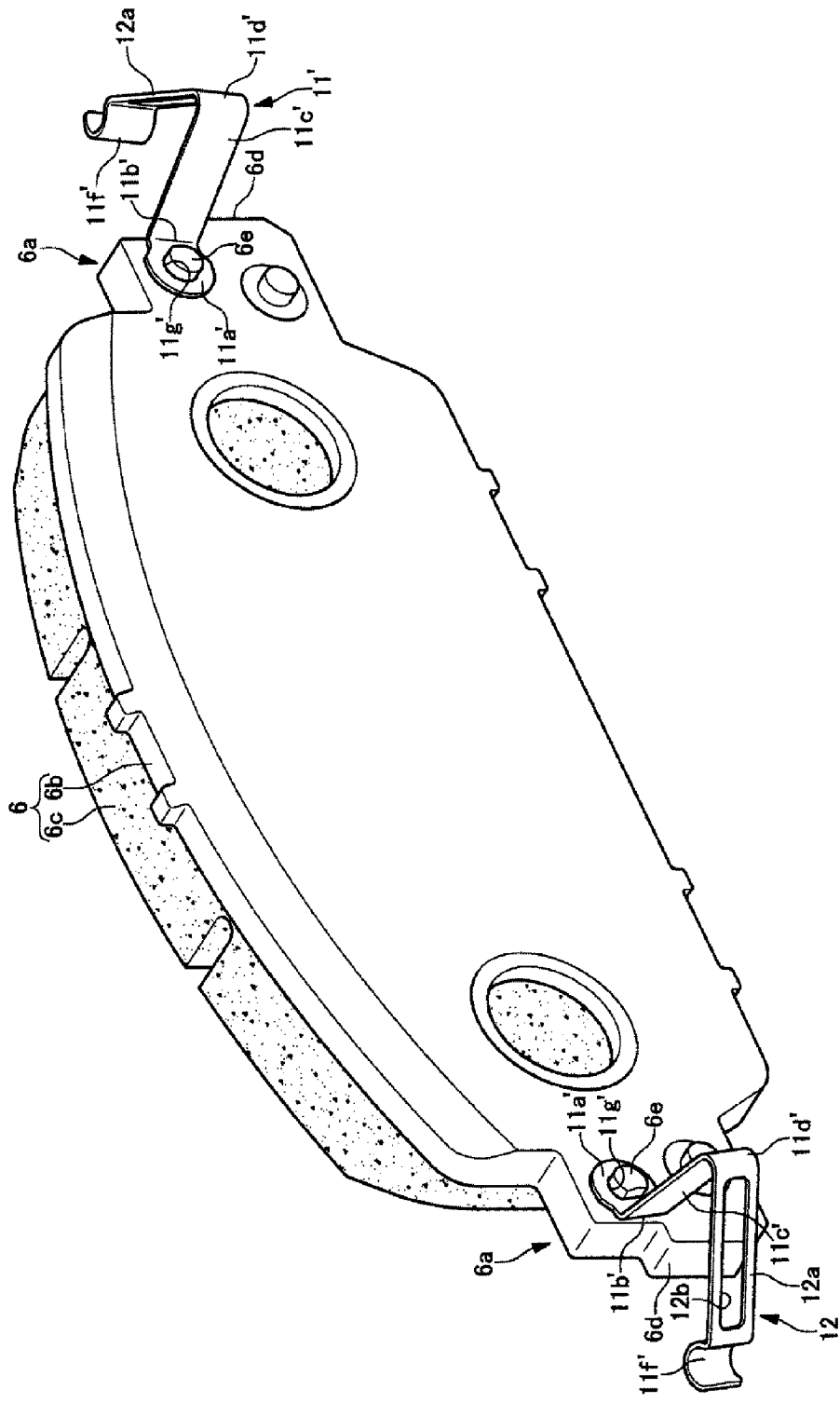
FIG. 21 is a perspective view of a friction pad of Embodiment 3 to which a pad return spring is assembled.

FIGS. 19 to 21 show a vehicle disc brake according to Embodiment 3. Like reference numerals will be given to like constituent elements to those of Embodiment 2, and the detailed description thereof will be omitted.

In Embodiment 3, a pad return spring is different from Embodiment 1 and Embodiment 2.

In a pad return spring 12 of Embodiment 3, a width of a first extending piece 11c' and a width direction of a second extending piece 12a are made identical, and a substantially rectangular elongated hole 12b is formed in the second extending piece 12a. This enables a sectional area of the second extending piece 12a to be smaller than a sectional area of the first extending piece 11c so that an increase in biasing force of the second extending piece 12a caused by the displacement thereof can be made moderate. The biasing force of the second extending piece 12a can easily be controlled by changing the length and shape of the elongated hole 12b. Even when an external force is exerted on the second extending piece 12a in a twisting direction, the external force so exerted is scattered to side portions of the elongated hole 12b, whereby the concentration of stress caused by the external force can be avoided.

The invention is not limited to Embodiment 2 and Embodiment 3. The configuration of the locking portion of the pad return spring is arbitrary, and hence, a configuration may be adopted in which a locking portion is formed into a U-shape so that a lug piece is engaged while being held therein. Plural circular or rectangular elongated holes may be formed in the second extending piece, so that the sectional area of the second extending piece can be made smaller than the sectional area of the first extending piece. The shapes of the other portions of the friction pad than the lug piece are arbitrary, as long as the friction pad includes the lug pieces, and the shape of the pad guide portion is also arbitrary as long as the pad guide portion can support the lug piece movably. The shape of the caliper body is also arbitrary.

While the several embodiments have been exemplified, these embodiments may be variously implemented with omissions, replacements, and/or changes and/or modifications, within the scope of the invention. For example, the configurations of Embodiment 1 and Embodiment 2 may be appropriately combined. Alternatively, the configurations of Embodiment 1 and Embodiment 3 may be appropriately combined. Such modifications will also fall within the scope of the invention.

The invention claimed is:

1. A vehicle disc brake including:
   a caliper body;
   a caliper bracket which is fixed to a vehicle body, and which has a pair of caliper support arms extending to straddle an outer edge of a disc rotor in an axial direction thereof, each caliper support arm having a pair of pad guide grooves;
   a pair of friction pads which is disposed at each side of the disc rotor, each friction pad having a backing plate, the backing plate having a pair of lug pieces extending from side portions thereof, the lug pieces being supported movably in the pad guide grooves; and
   a pad return spring which is disposed between the lug pieces and the caliper support arms to bias the friction pad so as to move away from the disc rotor when the brake is released,
   wherein an outer surface of each lug piece in a rotating direction of the disc rotor has a stepped shape in which a projecting length on a radially outer side is shorter than a projecting length on a radially inner side, and a space portion is defined between the radially outer side of the lug piece and the pad guide groove,
   wherein the space portion is disposed in a position where a first imaginary line passes, the first imaginary line being defined to pass a gravity center of the friction pad and to intersect perpendicularly a center line connecting a center of the disc rotor and a center of a piston, and
   wherein the gravity center of the friction pad lies further radially inwards than a center of the piston.

2. The vehicle disc brake of claim 1,
   wherein the space portion is disposed in the position where a second imaginary line also passes, the second imaginary line being defined to pass the center of the piston and to intersect perpendicularly the center line.

3. The vehicle disc brake of claim 1,
   wherein, in a first a state, the first imaginary line passes the gravity center of the friction pad and intersects perpendicularly the center line connecting the center of the disc rotor the center of the piston,
   wherein, in a second state, the lug pieces are fixed within the pad guide grooves restricting generation of brake noise or squeal, and
   wherein, in the second state, the space portion is disposed in a position where a second imaginary line passes the center of the piston and intersects perpendicularly the center line.

4. The vehicle disc brake of claim 1,
   wherein the pad return spring is a non-linear characteristic spring in which biasing force changes as the friction pads move in the axial direction of the disc rotor.

5. A vehicle disc brake including:
   a caliper body;
   a caliper bracket which is fixed to a vehicle body, and which has a pair of caliper support arms extending to straddle an outer edge of a disc rotor in an axial direction thereof, each caliper support arm having a pair of pad guide grooves;
   a pair of friction pads which is disposed at each side of the disc rotor, each friction pad having a backing plate, the backing plate having a pair of lug pieces extending from side portions thereof, the lug pieces being supported movably in the pad guide grooves; and
   a pad return spring which is disposed between the lug pieces and the caliper support arms to bias the friction pad so as to move away from the disc rotor when the brake is released,
   wherein an outer surface of each lug piece in a rotating direction of the disc rotor has a stepped shape in which a projecting length on a radially outer side is shorter than a projecting length on a radially inner side, and a space portion is defined between the radially outer side of the lug piece and the pad guide groove,
   wherein the space portion is disposed in a position where a first imaginary line passes, the first imaginary line being defined to pass a gravity center of the friction pad and to intersect perpendicularly a center line connecting a center of the disc rotor and a center of a piston, and
   wherein the pad return spring includes:
      a locking portion which is locked on the lug piece;
      a spring portion which is formed by bending back an extending piece which extends from the locking portion so as to move away from the disc rotor towards the disc rotor via a curved portion; and an abutment portion which is provided at a distal end of the spring portion and which is brought into abutment with a side surface of the caliper support aim which lies opposite to a side surface facing the disc rotor.

6. The vehicle disc brake of claim 5,
wherein the locking portion is also disposed in the position where the first imaginary line passes.

7. The vehicle disc brake of claim 5,
wherein the locking portion of the pad return portion is disposed in a position where the first imaginary line passes, whereby when the brake is released, the friction pads are pulled back in a horizontal direction by means of the spring force of the pad return spring so that the friction pads can move away from the side surface of the disc rotor.

8. The vehicle disc brake of claim 5,
wherein the abutment portion is an arc-like shape whose side facing the caliper bracket is convex.

9. The vehicle disc brake of claim 5,
wherein the spring portion of the pad return spring is not disposed in the space portion defined between the lug pieces and the pad guide grooves.

10. A vehicle disc brake including:
a caliper body;
a caliper bracket which is fixed to a vehicle body, and which has a pair of caliper support arms extending to straddle an outer edge of a disc rotor in an axial direction thereof, each caliper support arm having a pair of pad guide portions;
a pair of friction pads which is disposed at each side of the disc rotor, each friction pad having a backing plate, the backing plate having a pair of lug pieces extending from side portions thereof, the lug pieces being supported movably in the pad guide portions; and
a pad return spring which is disposed between the lug pieces and the caliper support arms to bias the friction pad so as to move away from the disc rotor when the brake is released,
wherein the pad return spring includes:
a locking portion which is locked on the lug piece;
a first extending piece which extends from the locking portion so as to move away from the disc rotor via a first curved portion;
a second extending piece which is formed by bending back a distal end portion of the first extending piece towards the disc rotor via a second curved portion; and
an abutment portion which is provided at a distal end of the second extending piece and which is brought into abutment with a side surface of the caliper support arm which lies opposite to a side surface facing the disc rotor,
wherein the first extending piece is provided so as to be inclined gradually outwards of the friction pad from the first curved portion to the second curved portion in a free state in which the locking portion is locked on the lug piece, and
wherein, when the friction pad is assembled to the pad guide portions and the abutment portion is brought into abutment with the side surface of the caliper support arm which lies opposite to the side surface facing the disc rotor, the first extending piece comes near to a state in which the first extending piece is parallel to an axis of the disc rotor, and as the friction pad moves towards the disc rotor, the first extending piece comes nearer to the state in which the first extending piece is parallel to the axis of the disc rotor, thereby decreasing gradually a displacement amount thereof.

11. The vehicle disc brake of claim 10,
wherein a sectional area of the second extending piece is smaller than a sectional area of the first extending piece.

12. The vehicle disc brake of claim 10,
wherein a width of the second extending piece is narrower than a width of the first extending piece.

13. The vehicle disc brake of claim 10,
wherein an elongated hole is formed in the second extending piece.

14. A vehicle disc brake including:
a caliper body;
a caliper bracket which is fixed to a vehicle body, and which has a pair of caliper support arms extending to straddle an outer edge of a disc rotor in an axial direction thereof, each caliper support arm having a pair of pad guide grooves;
a pair of friction pads which is disposed at each side of the disc rotor, each friction pad having a backing plate, the backing plate having a pair of lug pieces extending from side portions thereof, the lug pieces being supported movably in the pad guide grooves; and
a pad return spring which is disposed between the lug pieces and the caliper support arms to bias the friction pad so as to move away from the disc rotor when the brake is released,
wherein an outer surface of each lug piece in a rotating direction of the disc rotor has a stepped shape in which a projecting length on a radially outer side is shorter than a projecting length on a radially inner side, and a space portion is defined between the radially outer side of the lug piece and the pad guide groove,
wherein the space portion is disposed in a position where a first imaginary line passes, the first imaginary line being defined to pass a gravity center of the friction pad and to intersect perpendicularly a center line connecting a center of the disc rotor and a center of a piston, and
wherein the pad return spring includes:
a locking portion which is locked on the lug piece,
a first extending piece which extends from the locking portion away from the disc rotor via a first curved portion,
a second extending piece which is formed by bending back a distal end portion of the first extending piece towards the disc rotor via a second curved portion, and
an abutment portion which is provided at a distal end of the second extending piece and which is brought into abutment with a side surface of the caliper support arm which lies opposite to a side surface facing the disc rotor.

15. The vehicle disc brake of claim 14,
wherein a width of the second extending piece is narrower than a width of the first extending piece, and the abutment portion is formed into an arc-like shape whose side facing the caliper bracket becomes convex.

16. The vehicle disc brake of claim 15,
wherein when the pad return spring is left free, the first extending piece is inclined outwards of the friction pad from the first curved portion towards the second curved portion,
the lug pieces of the friction pad are inserted into the pad guide grooves to which pad retainers are attached, and the abutment portion is brought into abutment with a side surface of the caliper support arm which lies opposite to the side surfaces facing the disc rotor, and the first extending piece comes near to a state in which the first extending piece becomes parallel to an axis of the disc rotor from the inclined state.

17. The vehicle disc brake of claim 14, wherein a width of a first extending piece and a width direction of the second extending piece are made identical, and a substantially rectangular elongated hole is formed in the second extending piece.

18. The vehicle disc brake of claim 14, wherein a sectional area of the second extending piece is smaller than a sectional area of the first extending piece.

19. The vehicle disc brake of claim 18, wherein a width of the second extending piece is narrower than the width of the first extending piece, and wherein an elongated hole is provided in the second extending piece.

\* \* \* \* \*